United States Patent
Park et al.

(10) Patent No.: US 9,606,574 B2
(45) Date of Patent: Mar. 28, 2017

(54) FOLDABLE DISPLAY DEVICE AND METHOD FOR CONTROLLING THE SAME

(71) Applicant: LG ELECTRONICS INC., Seoul (KR)

(72) Inventors: Sihwa Park, Seoul (KR); Doyoung Lee, Seoul (KR); Jihwan Kim, Seoul (KR); Sinae Chun, Seoul (KR)

(73) Assignee: LG Electronics Inc., Seoul (KR)

( * ) Notice: Subject to any disclaimer, the term of this patent is extended or adjusted under 35 U.S.C. 154(b) by 30 days.

(21) Appl. No.: 14/337,998

(22) Filed: Jul. 22, 2014

(65) Prior Publication Data

US 2015/0325216 A1  Nov. 12, 2015

(30) Foreign Application Priority Data

May 12, 2014  (KR) .................. 10-2014-0056286

(51) Int. Cl.
*G06F 1/16* (2006.01)
*G09G 5/00* (2006.01)
(Continued)

(52) U.S. Cl.
CPC .............. *G06F 1/16* (2013.01); *G06F 1/1641* (2013.01); *G06F 3/147* (2013.01); *G09G 5/00* (2013.01); *G09G 5/006* (2013.01); *G09G 5/377* (2013.01); *G09G 5/38* (2013.01); *G09G 2340/10* (2013.01); *G09G 2354/00* (2013.01); *G09G 2360/04* (2013.01); *G09G 2380/02* (2013.01); *G09G 2380/14* (2013.01)

(58) Field of Classification Search
CPC ...... G06F 1/1616; G06F 1/1618; G06F 1/162; G06F 1/1641
See application file for complete search history.

(56) References Cited

U.S. PATENT DOCUMENTS 7,109,967 B2   9/2006  Hioki et al.
7,443,380 B2  10/2008  Nozawa
(Continued)

OTHER PUBLICATIONS

Khalilbeigi, Mohammadreza, et al. "FoldMe: interacting with double-sided foldable displays." Proceedings of the Sixth International Conference on Tangible, Embedded and Embodied Interaction. ACM, 2012.*

*Primary Examiner* — Ulka Chauhan
*Assistant Examiner* — Sae Won Yoon
(74) *Attorney, Agent, or Firm* — Birch, Stewart, Kolasch & Birch, LLP

(57) ABSTRACT

A method for controlling a foldable display device comprises displaying first content provided from a first application on a first display region and second content provided from a second application on a second display region in a folded state of the foldable display device, the first application and the second application being applications which are previously installed in the foldable display device; generating a third display region by merging the first display region and the second display region with each other and generating a third application by using at least one of the first application and the second application if the foldable display device is unfolded; and displaying third content provided from the third application on the third display region, the third content being the content generated by reorganizing the first content and the second content.

15 Claims, 26 Drawing Sheets

(51) Int. Cl.
*G09G 5/377* (2006.01)
*G09G 5/38* (2006.01)
*G06F 3/147* (2006.01)

(56) References Cited

U.S. PATENT DOCUMENTS

| | | |
|---|---|---|
| 7,880,718 B2 | 2/2011 | Cradick et al. |
| 8,508,433 B2 | 8/2013 | Manning |
| 8,532,712 B2 | 9/2013 | Jang |
| 8,587,539 B2 | 11/2013 | Tziortzis et al. |
| 8,732,193 B2* | 5/2014 | Skeen ............... G06F 17/30752 705/14.23 |
| 2004/0008191 A1 | 1/2004 | Poupyrev et al. |
| 2006/0034042 A1* | 2/2006 | Hisano ................... G06F 1/1616 361/679.04 |
| 2008/0066012 A1* | 3/2008 | Goodwin ........... H04N 5/44543 715/825 |
| 2008/0303782 A1 | 12/2008 | Grant et al. |
| 2009/0158154 A1* | 6/2009 | Kim ................... G06F 17/30044 715/716 |
| 2009/0219247 A1 | 9/2009 | Watanabe et al. |
| 2009/0293011 A1* | 11/2009 | Nassar ............. G06F 17/30241 715/781 |
| 2010/0011291 A1 | 1/2010 | Nurmi |
| 2010/0039350 A1* | 2/2010 | Wakefield ............. G06F 1/1616 345/1.3 |
| 2010/0081475 A1 | 4/2010 | Chiang et al. |
| 2010/0117975 A1 | 5/2010 | Cho |
| 2010/0141605 A1 | 6/2010 | Kang et al. |
| 2010/0182265 A1* | 7/2010 | Kim ...................... G06F 1/1616 345/173 |
| 2010/0295802 A1* | 11/2010 | Lee ....................... G06F 1/1626 345/173 |
| 2011/0057873 A1 | 3/2011 | Geissler et al. |
| 2011/0109567 A1* | 5/2011 | Kim ...................... G06F 1/1641 345/173 |
| 2011/0119250 A1* | 5/2011 | Lacasse ........... G06F 17/30867 707/717 |
| 2011/0138267 A1 | 6/2011 | Yi et al. |
| 2011/0187662 A1* | 8/2011 | Lee ....................... G06F 1/1641 345/173 |
| 2012/0112994 A1 | 5/2012 | Vertegaal et al. |
| 2012/0169609 A1 | 7/2012 | Britton |
| 2012/0299813 A1* | 11/2012 | Kang ................... G06F 1/1641 345/156 |
| 2013/0044240 A1 | 2/2013 | Leskela et al. |
| 2013/0069969 A1* | 3/2013 | Chang ................... H04L 12/581 345/589 |
| 2013/0127606 A1 | 5/2013 | Chang |
| 2013/0135182 A1 | 5/2013 | Jung et al. |
| 2013/0145311 A1 | 6/2013 | Joo |
| 2013/0201115 A1 | 8/2013 | Heubel |
| 2013/0229324 A1* | 9/2013 | Zhang ..................... G09G 5/00 345/1.3 |
| 2013/0321340 A1* | 12/2013 | Seo ....................... G06F 1/1641 345/174 |
| 2013/0332881 A1* | 12/2013 | Yook ................... G06F 3/0481 715/781 |
| 2014/0002402 A1 | 1/2014 | Kang et al. |
| 2014/0035869 A1 | 2/2014 | Yun et al. |
| 2014/0049464 A1* | 2/2014 | Kwak ................... G06F 3/0487 345/156 |
| 2014/0055429 A1* | 2/2014 | Kwon ................... G09G 3/001 345/204 |
| 2014/0062976 A1 | 3/2014 | Park et al. |
| 2014/0068473 A1 | 3/2014 | Jano et al. |
| 2014/0089822 A1* | 3/2014 | Wu ........................ G06Q 10/10 715/761 |
| 2014/0089863 A1* | 3/2014 | Mo .................... G06F 17/30864 715/863 |
| 2014/0098095 A1* | 4/2014 | Lee ....................... G06F 3/041 345/420 |
| 2014/0123062 A1* | 5/2014 | Nguyen ............. G01C 21/3682 715/810 |
| 2014/0244155 A1* | 8/2014 | Abe ...................... G01C 21/00 701/410 |
| 2014/0359510 A1* | 12/2014 | Graf .................. G01C 21/3614 715/771 |

* cited by examiner

FIG. 1
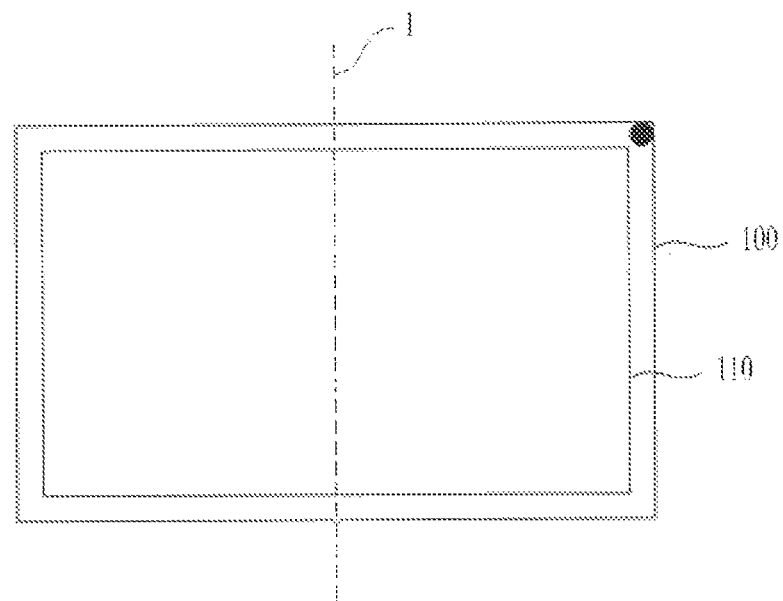
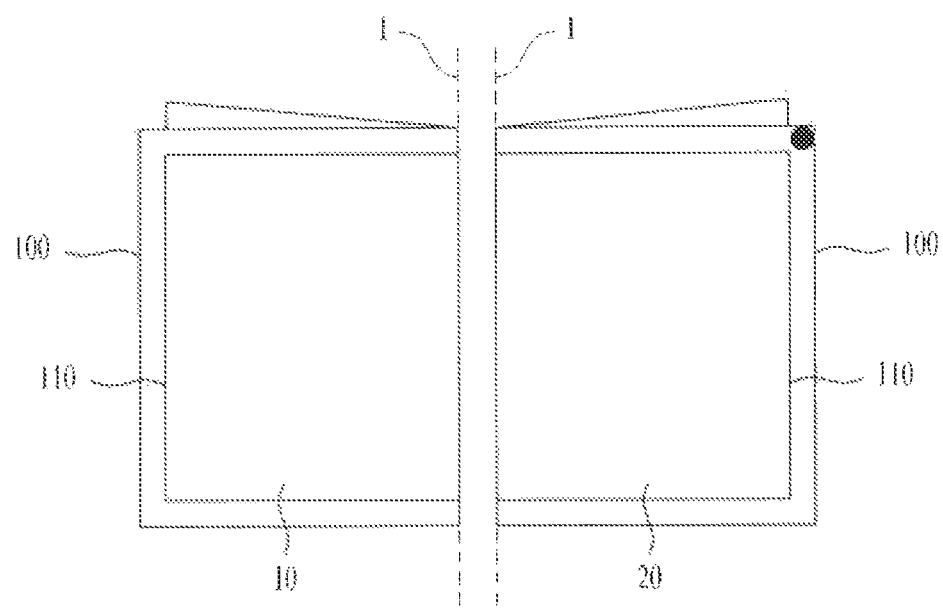

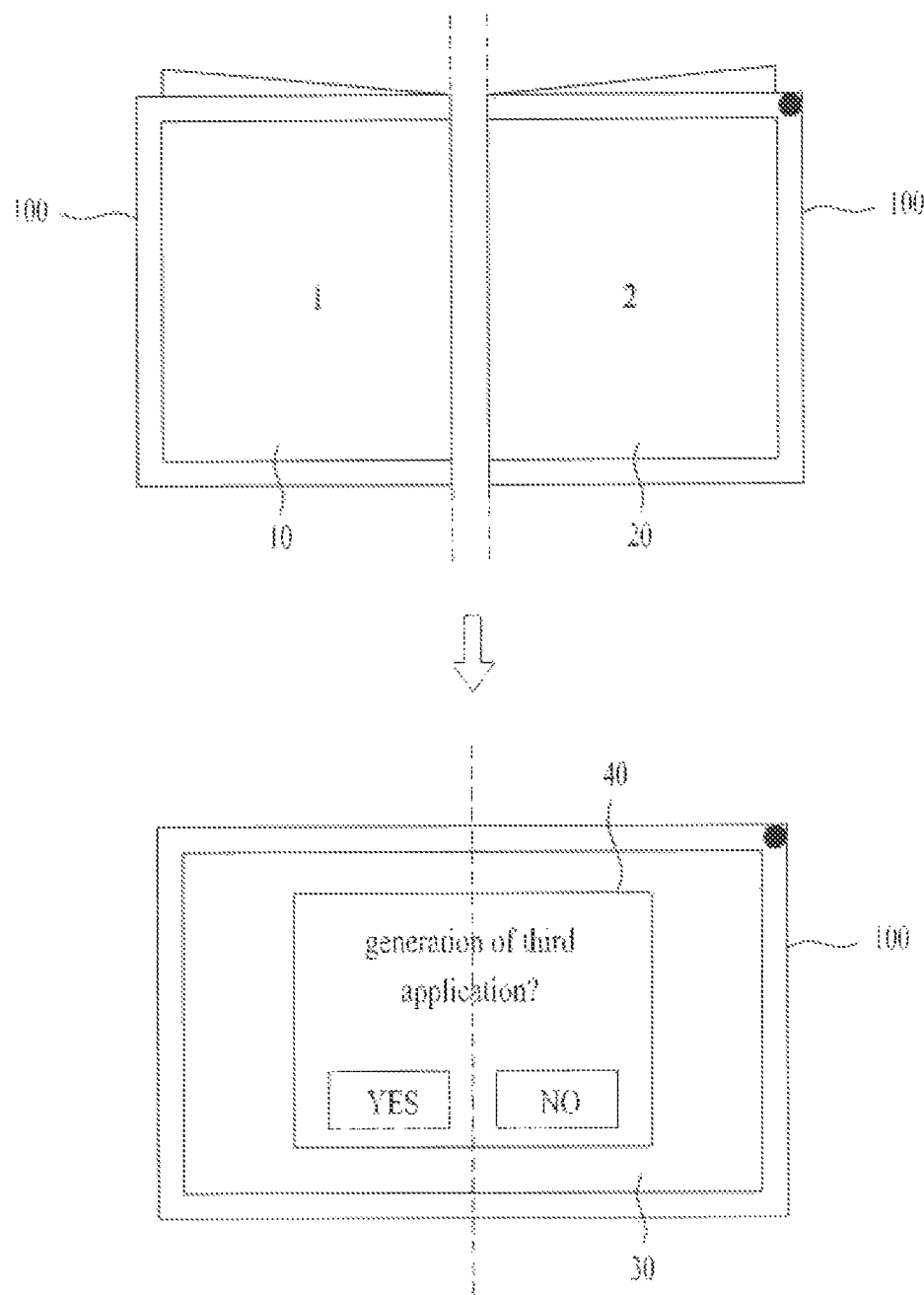

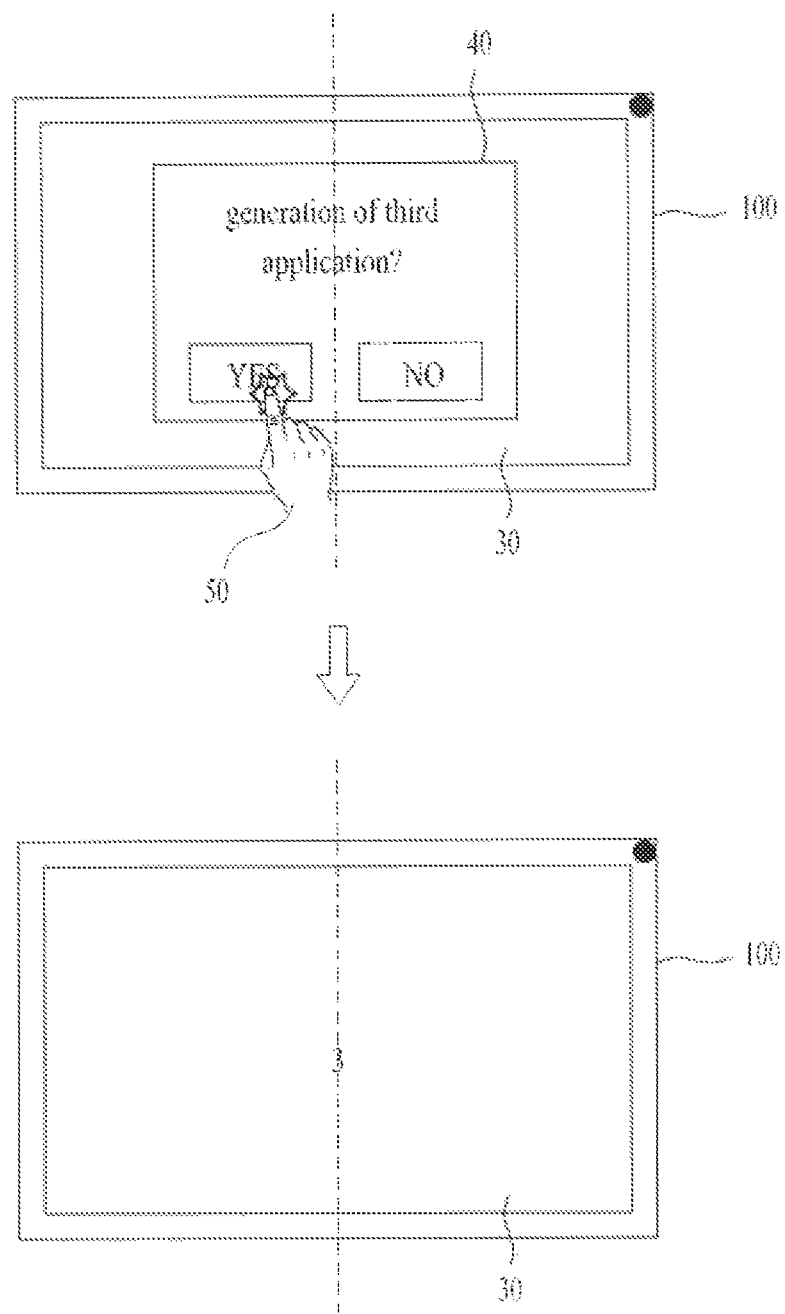

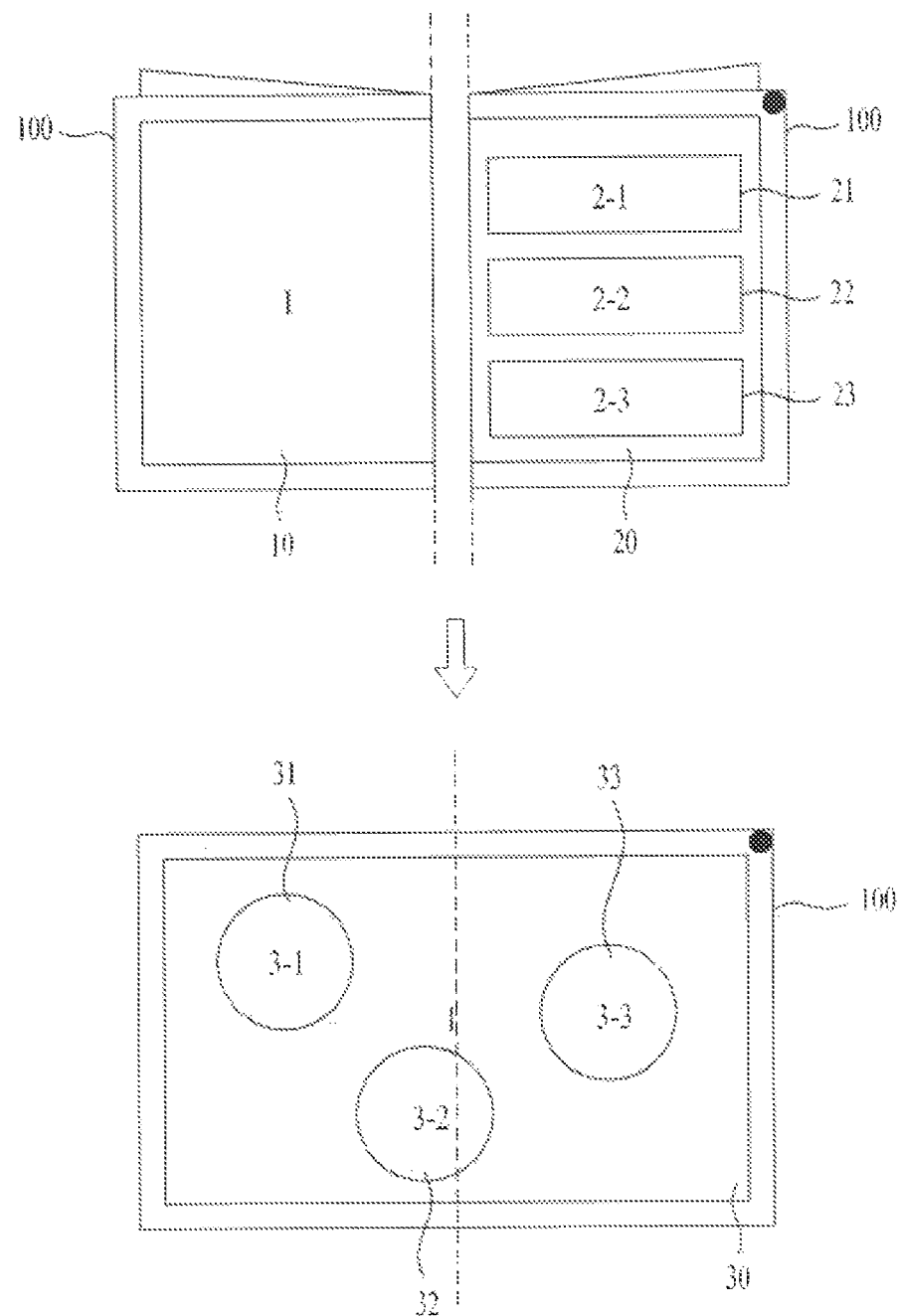

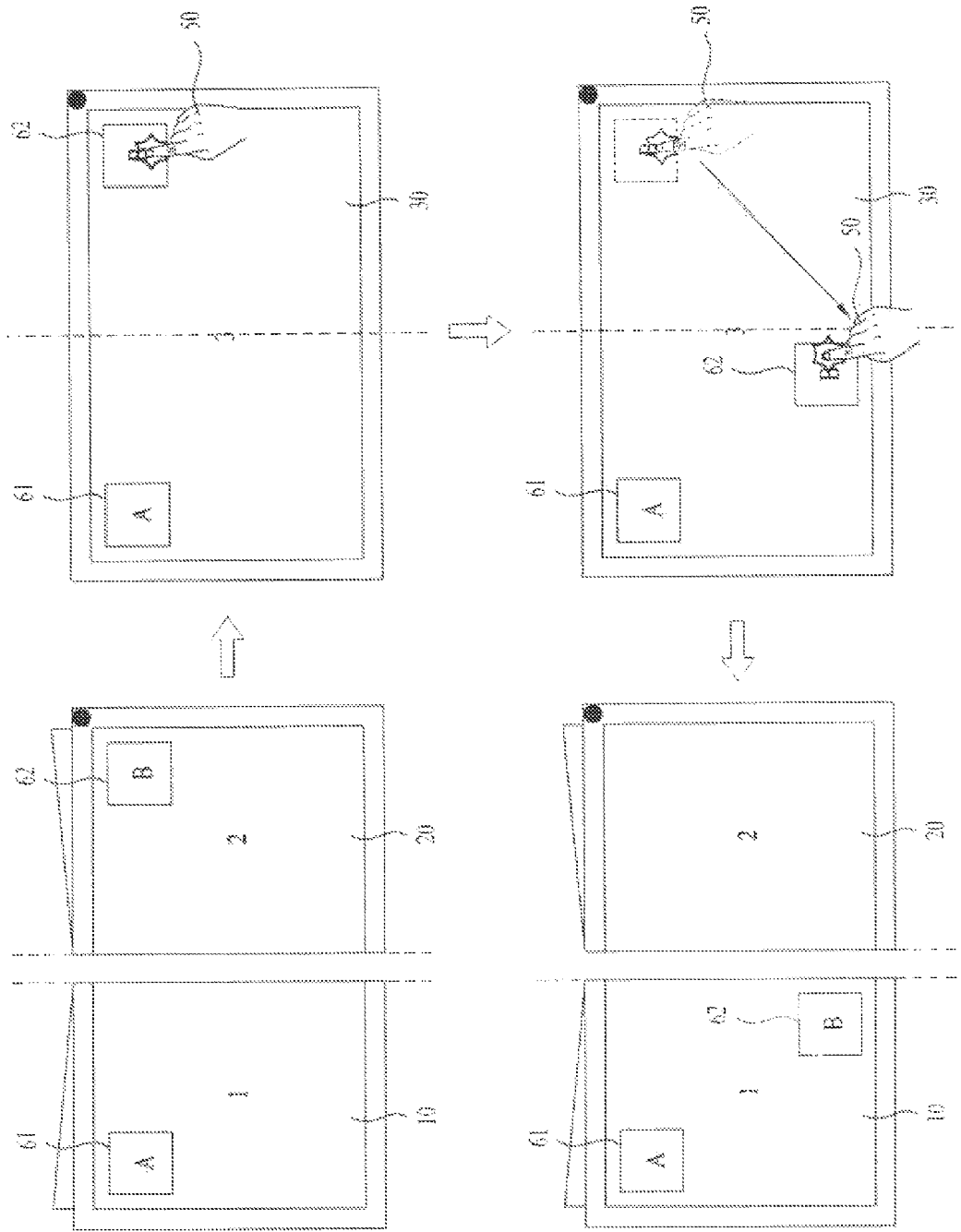

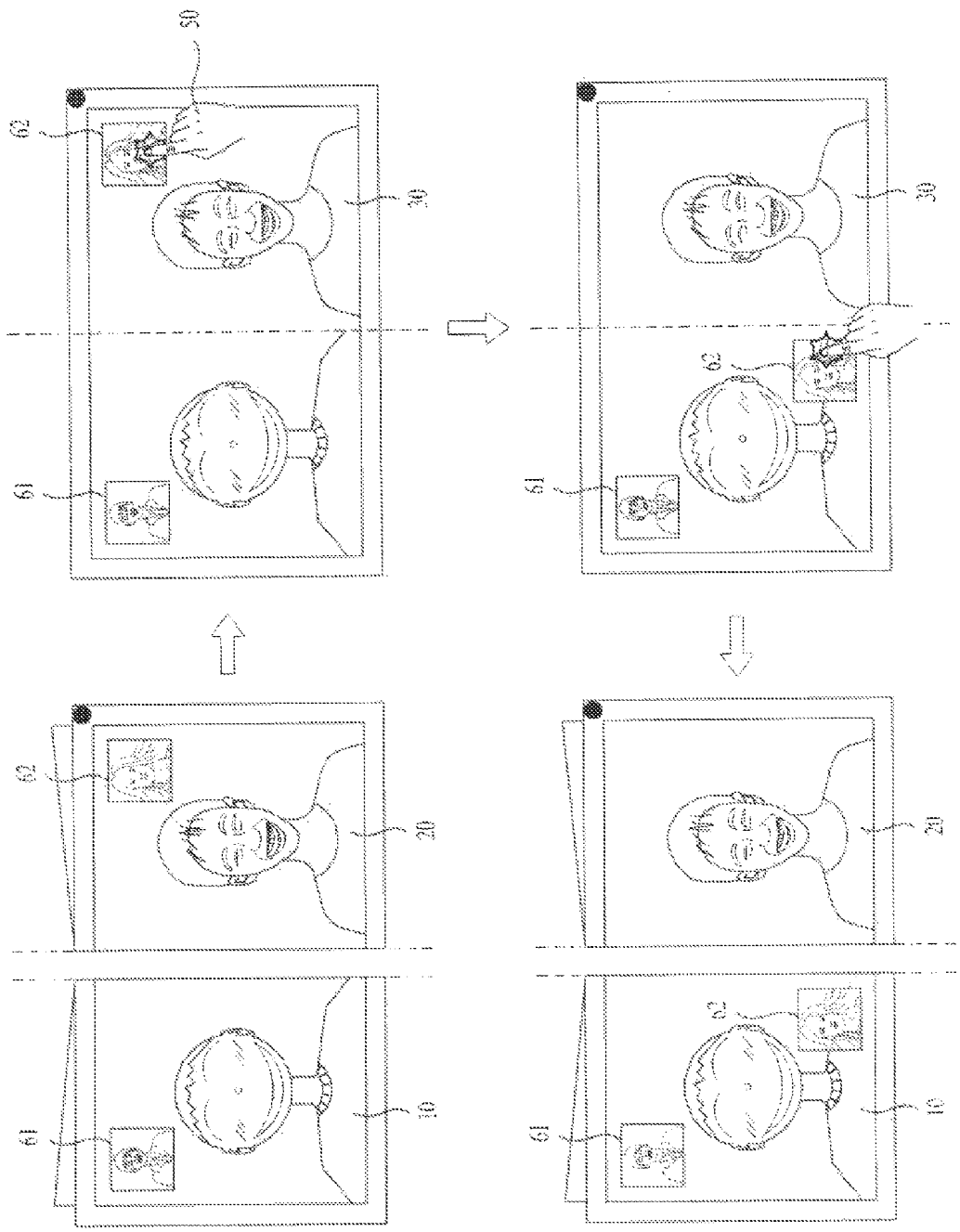

FOLDABLE DISPLAY DEVICE AND METHOD FOR CONTROLLING THE SAME

Pursuant to 35 U.S.C. §119(a), this application claims the benefit of the Korean Patent Application No. 10-2014-0056286, filed on May 12, 2014, which is hereby incorporated by reference as if fully set forth herein.

BACKGROUND OF THE INVENTION

Field of the Invention

The present specification relates to a foldable display device, and more particularly, to a foldable display device, which displays contents, and a method for controlling the same.

Discussion of the Related Art

Recently, with the development of technology, a portable display device has been commercialized, whereby users could use the display device by carrying it with their hands. Meanwhile, the portable display device may be manufactured using a flexible material or in a foldable type to increase portability.

Such a foldable display device includes a display region, which may display contents, wherein the display region is varied depending on a folded state or unfolded state. Accordingly, the technique for adaptively coordinating contents displayed in the display region which is varied depending on a folded state of the foldable display device will be required.

SUMMARY OF THE INVENTION

Accordingly, the present specification is directed to a foldable display device and a method for controlling the same, which substantially obviate one or more problems due to limitations and disadvantages of the related art.

An object of the present specification is to provide a foldable display device and a method for controlling the same, in which contents are varied adaptively depending on folding or unfolding of a display region.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a foldable display device according to one embodiment of the present specification comprises a display unit including a first display region and a second display region; a sensor unit configured to detect that the foldable display device is folded or unfolded; and a processor configured to control the display unit and the sensor unit, wherein the processor displays first content provided from a first application on the first display region and second content provided from a second application on the second display region in a folded state of the foldable display device, the first application and the second application being applications which are previously installed in the foldable display device, generates a third display region by merging the first display region and the second display region with each other and generates a third application by using at least one of the first application and the second application if the foldable display device is unfolded, and displays third content provided from the third application on the third display region, the third content being the content generated by reorganizing the first content and the second content.

In another aspect of the present specification, a method for controlling a foldable display device comprises displaying first content provided from a first application on a first display region and second content provided from a second application on a second display region in a folded state of the foldable display device, the first application and the second application being applications which are previously installed in the foldable display device; generating a third display region by merging the first display region and the second display region with each other and generating a third application by using at least one of the first application and the second application if the foldable display device is unfolded; and displaying third content provided from the third application on the third display region, the third content being the content generated by reorganizing the first content and the second content.

According to the present specification, the foldable display device of a folded state may display different contents provided from different applications in each of split display regions.

Also, according to the present specification, if the foldable display device of a folded state is unfolded, the foldable display device may merge the split display regions and merge different applications, which provide different contents to each of the split regions.

Also, according to the present specification, the foldable display device may display new contents, which are obtained by reorganizing contents displayed in each of the split display regions, in the merged display region.

Also, according to the present specification, if the foldable display device of an unfolded state is folded, the foldable display device may re-split the display region and display different contents in each of the re-split display regions.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification. In the drawings:

FIG. 1 is a diagram illustrating a foldable display device according to one embodiment of the present specification;

FIGS. 3A-3C are diagrams illustrating a method for allowing a foldable display device to display contents in accordance with another embodiment of the present specification;

FIGS. 6A-6D are diagrams illustrating a method for allowing a foldable display device to display contents if the foldable display device according to the third embodiment of the present specification is unfolded;

FIGS. 9A-9C are diagrams illustrating a method for allowing a foldable display device to display contents if the foldable display device according to another embodiment of the present specification is folded;

DETAILED DESCRIPTION OF THE INVENTION

Figure 2:
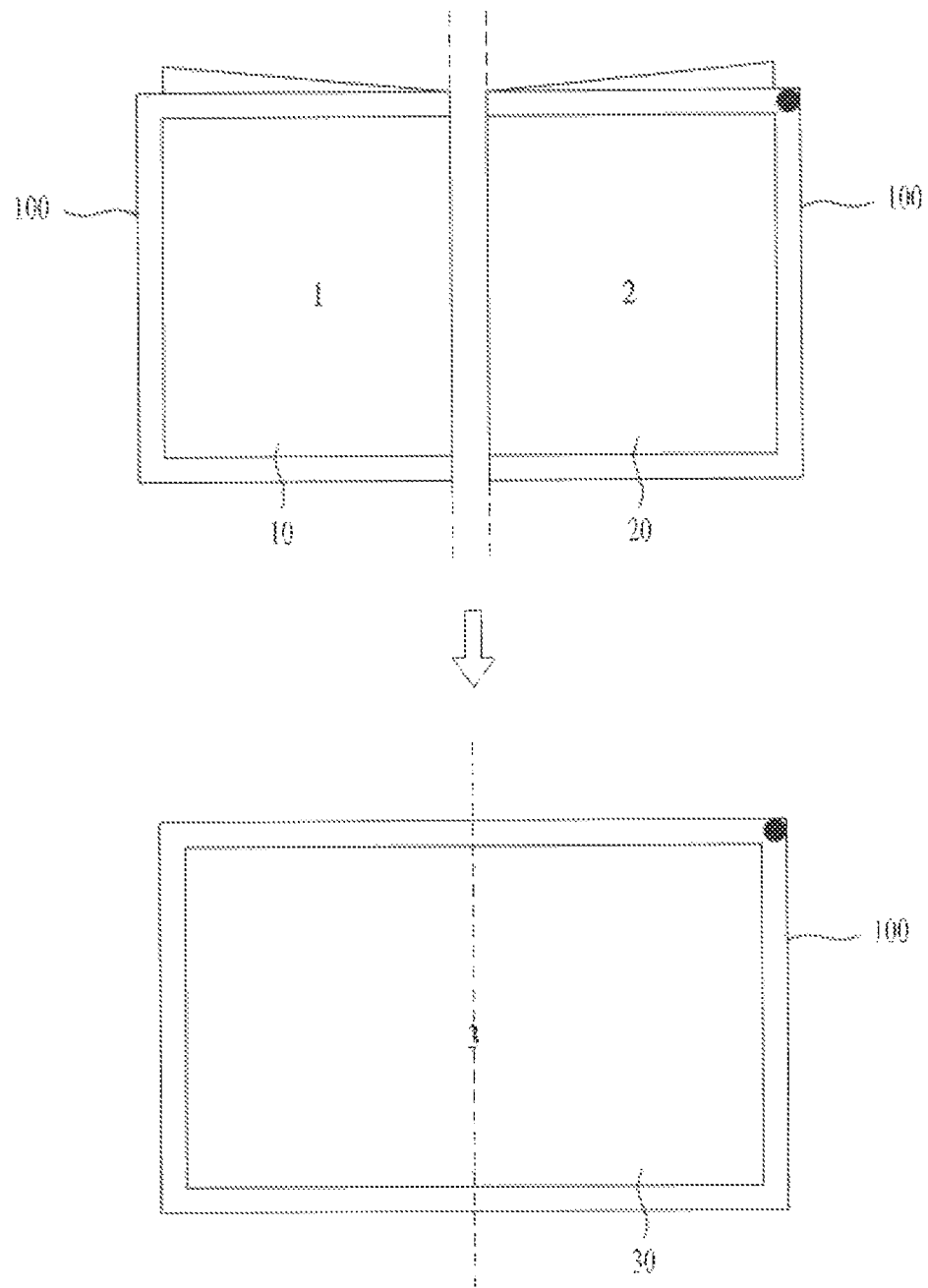
FIG. 2 is a diagram illustrating a method for allowing a foldable display device to display contents in accordance with one embodiment of the present specification.

Reference will now be made in detail to the preferred embodiments of the present specification, examples of which are illustrated in the accompanying drawings. Wherever possible, the same reference numbers will be used throughout the drawings to refer to the same or like parts.

Although the embodiments will be described in detail with reference to the accompanying drawings and the disclosure described by the drawings, it is to be understood that claims of the present specification are not limited by such embodiments.

Although the terms used in the present specification are selected from generally known and used terms considering their functions in the present specification, the terms can be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

In this specification, a foldable display device is a digital device that may display images, and may be various digital devices that include a foldable display unit. For example, the foldable display device may include a foldable smart phone, a foldable smart pad, a foldable music player, a foldable tablet computer, a foldable notebook computer, or a flexible display device, each of which includes a foldable display unit. Hereinafter, the foldable display device may be abbreviated as a foldable device.

FIG. 1 is a diagram illustrating a foldable display device according to one embodiment of the present specification. In more detail, the top of FIG. 1 illustrates a front view of a foldable display device of an unfolded state, and the bottom of FIG. 1 illustrates a front view of a foldable display device of a folded state.

Referring to the top of FIG. 1, the foldable display device 100 may include a display unit 110, which may be folded or flexible. The foldable display device 100 may include the display unit 110 on a front region. The display unit 110 may include a touch sensitive surface.

The display unit 110 of the unfolded state may be folded or bent on the basis of a folding axis of the foldable display device 100. The foldable display device 100 may include at least one folding axis 1. For example, as shown in FIG. 1, the foldable display device 100 having one folding axis 1 may be folded at a size of ½ by splitting the display unit 110 into two regions. Hereinafter, although the two-split foldable display device 100 having one folding axis 1 will be described exemplarily, the disclosure of the present specification may be applied to a three or more-split foldable display device 100.

Referring to the bottom of FIG. 1, the foldable display device 100 of the unfolded state may be folded on the basis of the folding axis 1. The display unit 110 of the folded state may be split into two regions by the folding axis 1. At this time, the region located at the left side of the folding axis 1 in the display unit 110 of the folded state may be defined as a first display region 10, and the region located at the right side of the folding axis 1 in the display unit 110 of the folded state may be defined as a second display region 20. For example, the foldable display device 100 of the unfolded state may be folded in a direction to which the first display region 10 and the second display region 20 are externally exposed.

The foldable display device 100 may display different contents in each of the split display regions. In this case, the contents may be an execution screen provided by an application.

FIG. 2 is a diagram illustrating a method for allowing a foldable display device to display contents in accordance with one embodiment of the present specification. In more detail, the top of FIG. 2 illustrates a method for allowing a foldable display device of a folded state to display contents, and the bottom of FIG. 2 illustrates a method for allowing a foldable display device of a folded state to display contents if the foldable display device of the folded state is unfolded.

Referring to the top of FIG. 2, the foldable display device 100 of the folded state may display first content provided from a first application on the first display region 10 and second content provided from a second application on the second display region 20. In this case, the first application and the second application may be the applications which are previously installed in the foldable display device 100. At this time, the first application and the second application may be different from each other. For example, the first application may be a map application, and the second application may be a search application. Also, the first application and the second application may be the same as each other. For example, the first application and the second application may be same messenger application.

Referring to the bottom of FIG. 2, the foldable display device 100 of the folded state may be unfolded. If the foldable display device 100 is unfolded, the foldable display device 100 may generate a third display region 30 by merging the first display region 10 and the second display region 20. Also, if the foldable display device 100 is unfolded, the foldable display device 100 may generate a third application by using at least one of the first application and the second application.

In this case, the third application may mean the application that may generate a new third content by reorganizing the first content displayed in the first display region 10 when the foldable device 100 is unfolded and the second content displayed in the second display region 20 when the foldable device 100 is unfolded. This third application may be a merged application of the first application and the second application. Also, the third application may be the same application as the first application or the second application.

Also, the foldable device 100 of the unfolded state may display the third content provided from the third application on the third display region 30. In this case, the third content may be the content obtained by reorganizing the first content and the second content.

FIG. 3 is a diagram illustrating a method for allowing a foldable display device to display contents in accordance with another embodiment of the present specification.

Referring to the top of FIG. 3a, the foldable display device 100 of the folded state may display first content provided from a first application on the first display region 10 and second content provided from a second application on the second display region 20. Since the foldable display device based on the top of FIG. 3a is the same as the disclosure described with reference to the top of FIG. 2, its detailed description will be omitted.

Referring to the bottom of FIG. 3a, if the foldable display device 100 is unfolded, the foldable display device 100 may provide a third display region 30 with a feedback for requesting a user input as to whether a third application is generated. In this case, the feedback may be at least one of a visual feedback, an auditory feedback, and a tactile feedback.

Also, the foldable display device 100 may detect the user input as to whether the third application is generated. For example, as shown at the bottom of FIG. 3, the foldable display device 100 may provide a visual feedback 40 for requesting the user input as to whether the third application is generated, and may detect the user input for the visual feedback 40. In this case, the user input may be a touch input of a user.

As shown at the top of FIG. 3b, if the user input 50 for requesting generation of the third application is detected, the foldable display device 100 may generate the third application. In this case, as shown at the bottom of FIG. 3b, the foldable display device 100 may display third content, which is provided from the third application, in the third display region 30. In other words, the foldable display device 100 of the unfolded state may display a new third content by reorganizing the first content displayed in the first display region 10 before the foldable display device 100 of the unfolded state is folded and the second content displayed in the second display region 20 before the foldable display device 100 of the unfolded state is folded. Since this is the same as the disclosure described with reference to the bottom of FIG. 2, its detailed description will be omitted.

Figure 3C:
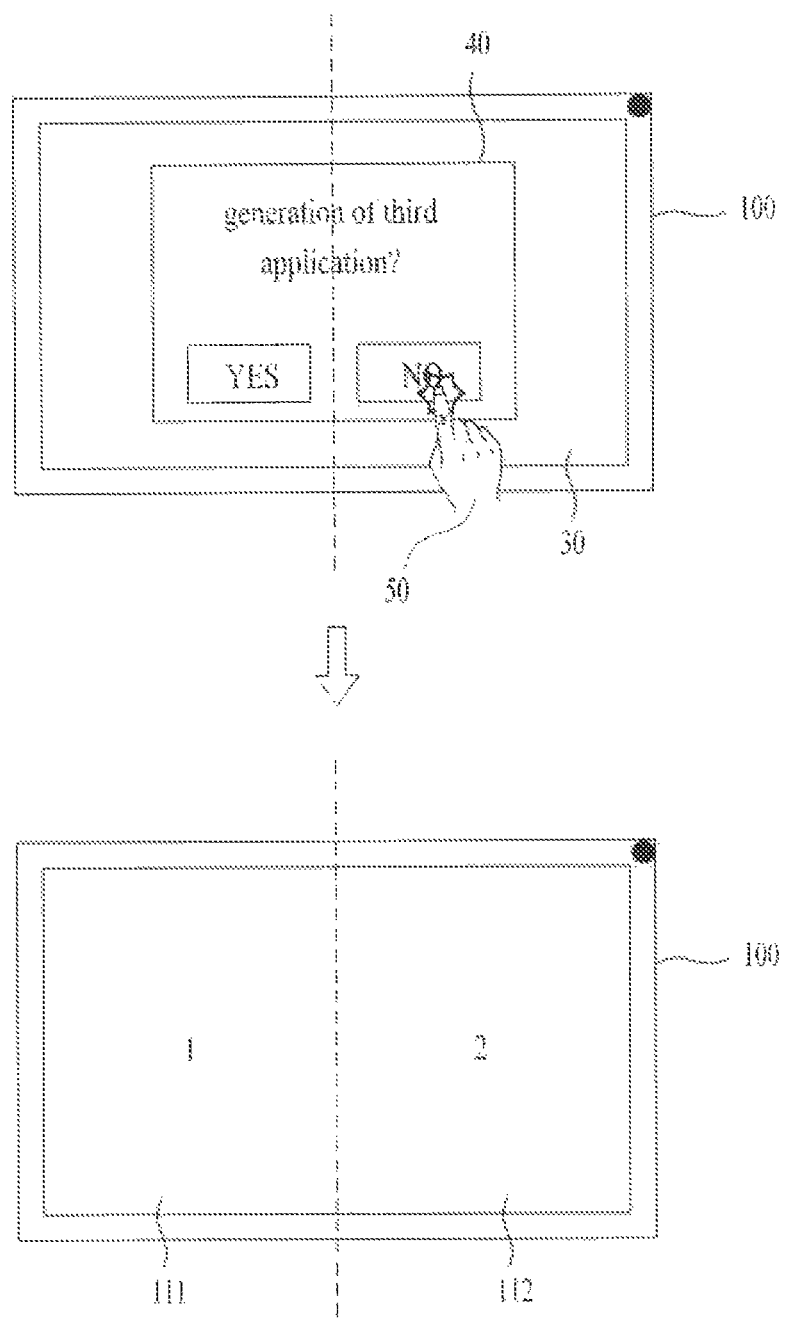

As shown at the top of FIG. 3c, if the user input 50 for requesting generation of the third application is not detected, the foldable display device 100 may not generate the third application. Also, if the user input 50 which does not request generation of the third application is detected, the foldable display device 100 may not generate the third application. In this case, as shown at the bottom of FIG. 3c, the foldable display device 100 may display the first content provided from the first application on a first region 31 of the third display region and the second content provided from the second application on a second region 32 of the third display region. In this case, the first region 31 of the third display region may correspond to the first display region 10, and the second region 32 of the third display region may correspond to the second display region 20. In other words, the foldable display device 100 of the unfolded state may continue to display the first content in the same region as the region where the first content is displayed before the foldable display device 100 is unfolded, and may continue to display the second content in the same region as the region where the second content is displayed before the foldable display device 100 is unfolded.

FIG. 4 is a diagram illustrating a method for allowing a foldable display device to display contents if the foldable display device according to the first embodiment of the present specification is unfolded.

Figure 4A:
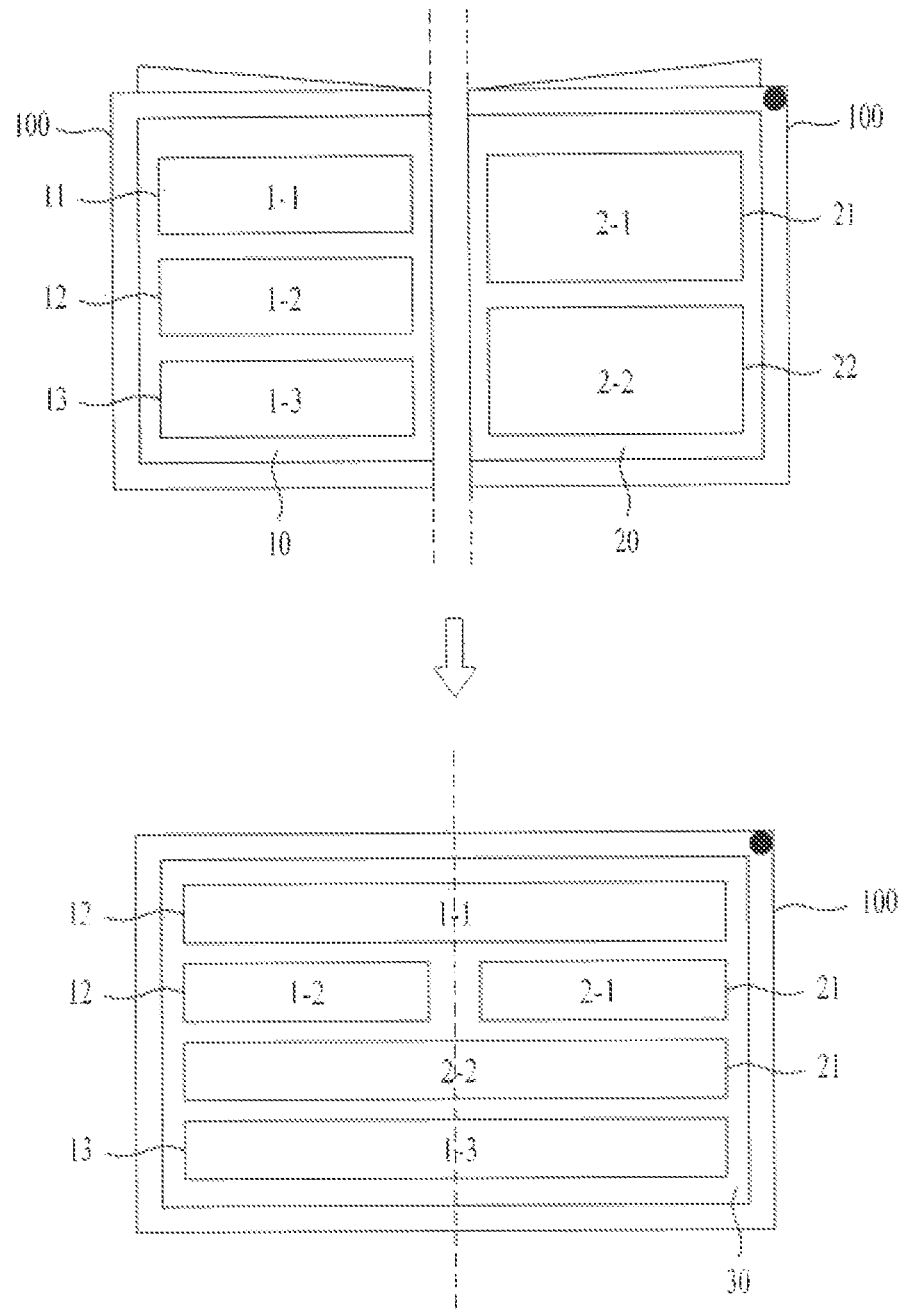
FIGS. 4A-4C are diagrams illustrating a method for allowing a foldable display device to display contents if the foldable display device according to the first embodiment of the present specification is unfolded.
Figure 4B:
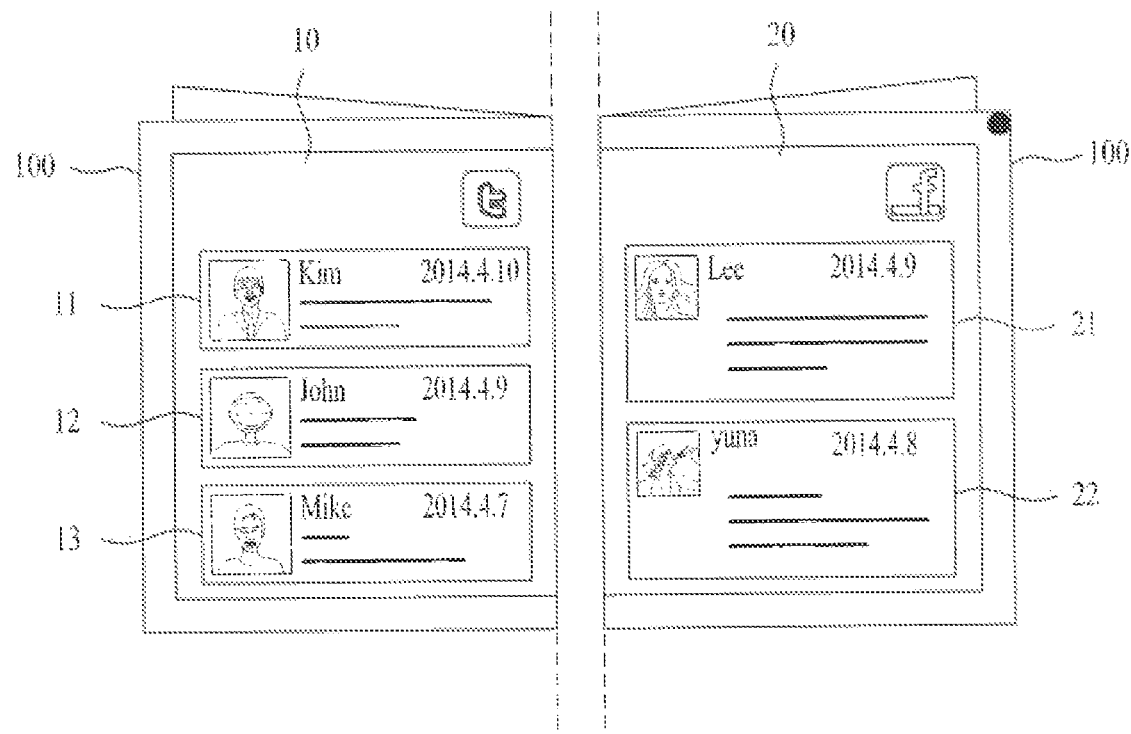
Figure 4C:
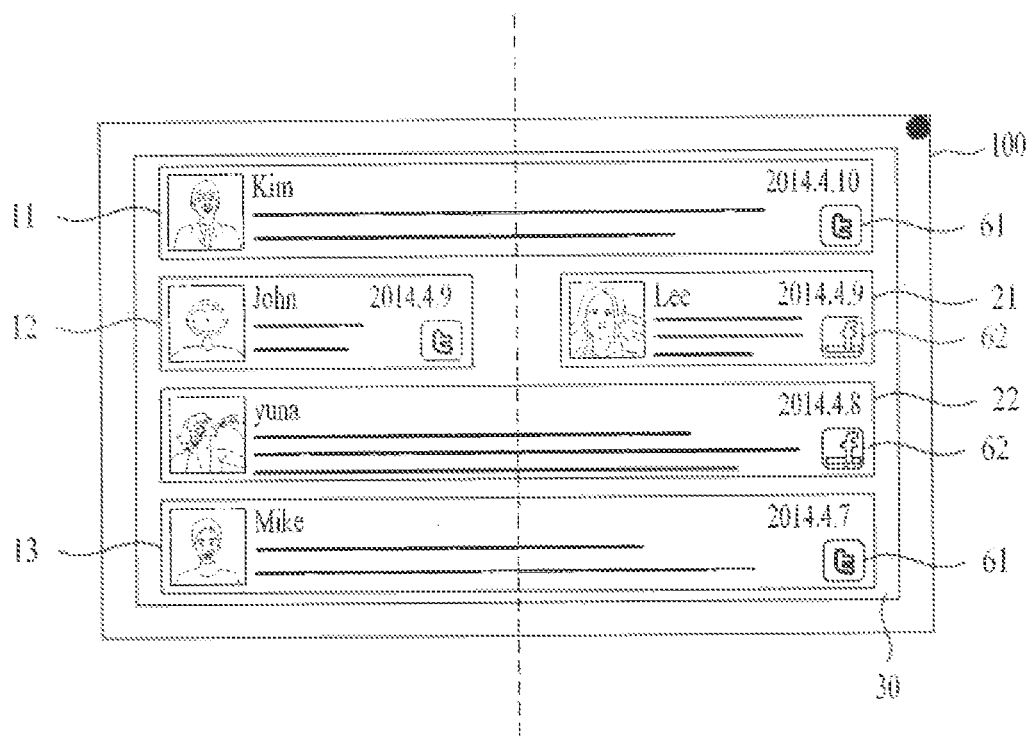

In more detail, the top of FIG. 4a illustrates a first method for allowing a foldable display device of a folded state to display first content and second content, and the top of FIG. 4b illustrates a first method for allowing a foldable display device of a unfolded state to display third content obtained by reorganizing the first content and the second content. Also, FIG. 4b illustrates a detailed embodiment of the top of FIG. 4a, and FIG. 4c illustrates a detailed embodiment of the bottom of FIG. 4a.

Referring to the top of FIG. 4a and FIG. 4b, the foldable display device 100 of the folded state may display first content provided from a first application on a first display region 10 and second content provided from a second application on a second display region 20.

In this case, the first application and the second application may be the applications which are previously installed in the foldable display device 100. For example, as shown in FIG. 4b, the first application and the second application may be social network service (SNS) applications which are previously installed in the foldable display device. At this time, the first application and the second application may be SNS applications different from each other.

In this case, each of the first content and the second content may include at least one part. For example, as shown at the top of FIG. 4a, the first content may include a first part 11 to a third part 13, and the second content may include a first part 21 and a second part 22. At this time, as shown in FIG. 4b, if the first application and the second application are SNS applications, each of the first part 11 to the third part 13 of the first content may be a time line provided from the first SNS application, and each of the first part 21 and the second part 22 of the second content may be a time line provided from the second SNS application.

Referring to the bottom of FIG. 4a and FIG. 4c, if the foldable display device 100 of the folded state is unfolded, the foldable display device 100 may generate a third display region 30 by merging the first display region 10 and the second display region 20. Also, if the foldable display device 100 is unfolded, the foldable display device 100 may generate a third application by using at least one of the first application and the second application. For example, the third application may be the merged SNS application obtained by merging the first application and the second application.

Also, the foldable display device 100 may display third content provided from the third application on the third display region 30. In this case, the third application may generate the third content, which is obtained by reorganizing the first content and the second content, by newly arranging the first content and the second content in accordance with a predetermined organization. For example, as shown at the bottom of FIG. 4a, the third application may generate the third content, which is obtained by reorganizing the first content and the second content, by newly arranging the first part 11 to the third part 13 of the first content and the first part 21 and the second part 22 of the second content in accordance with the predetermined organization. In other words, the third content includes all of the first part 11 to the third part 13 of the first content and the first part 21 and the second part 22 of the second content, and may be the reconfigured content of the first content and the second content, in which the parts included in the respective contents are newly arranged in accordance with the predetermined organization.

At this time, as shown in FIG. 4c, if the first application and the second application are SNS applications, the third application may generate the third content, which is obtained by reorganizing the first content and the second content, by newly arranging the first part 11 to the third part 13 of the first content and the first part 21 and the second part 22 of the second content in accordance with a time sequence. Also, the third application may further display a first indicator 61 indicating the first content in each part of the first content, and may further display a second indicator 62 indicating the second content in each part of the second content. However, the aforementioned example is only one embodiment of the third content, and the foldable display device 100 of the present specification is not limited to such embodiment.

FIG. 5 is a diagram illustrating a method for allowing a foldable display device to display contents if the foldable display device according to the second embodiment of the present specification is unfolded.

Figure 5A:
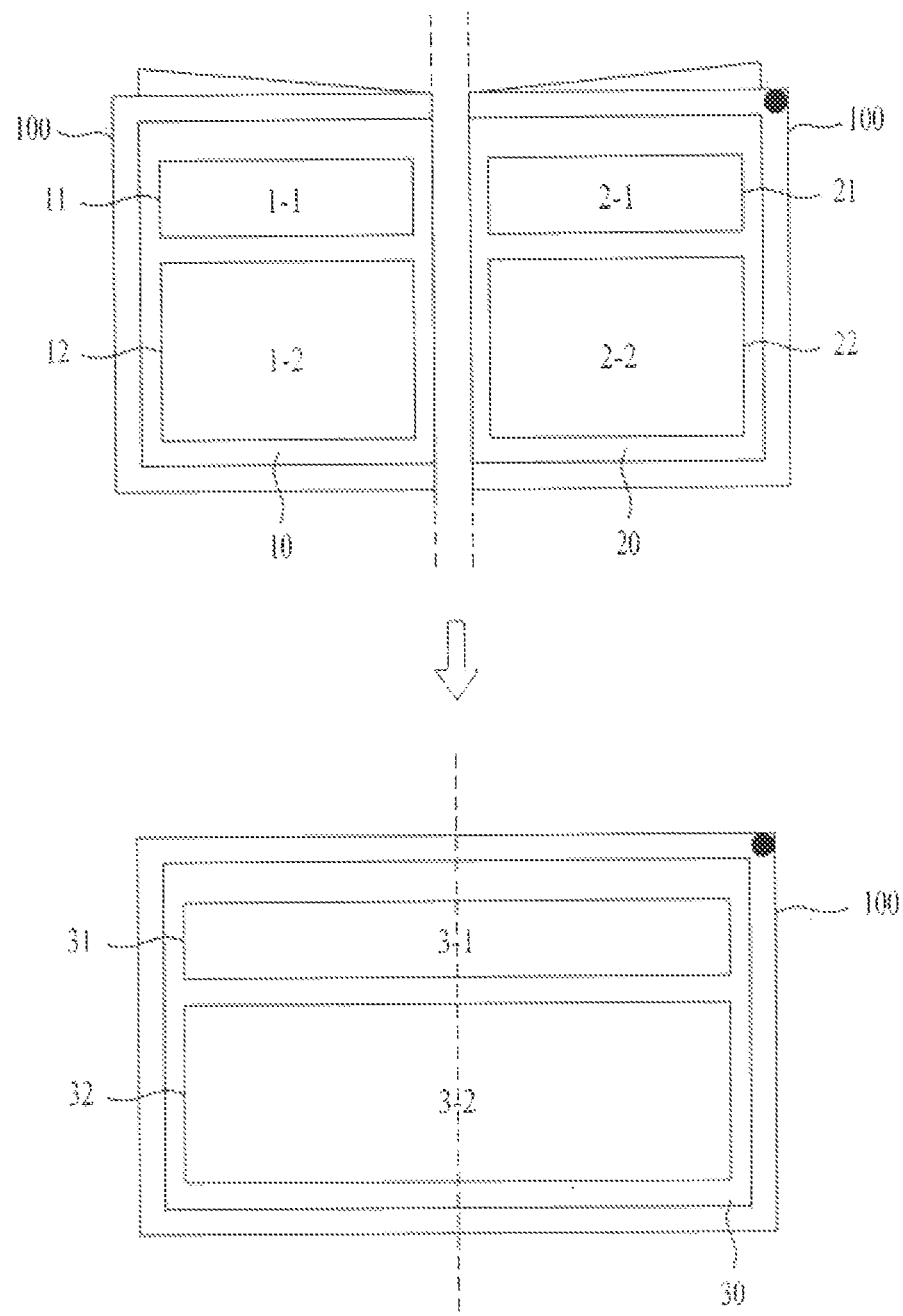
FIGS. 5A-5E are diagrams illustrating a method for allowing a foldable display device to display contents if the foldable display device according to the second embodiment of the present specification is unfolded.
Figure 5B:
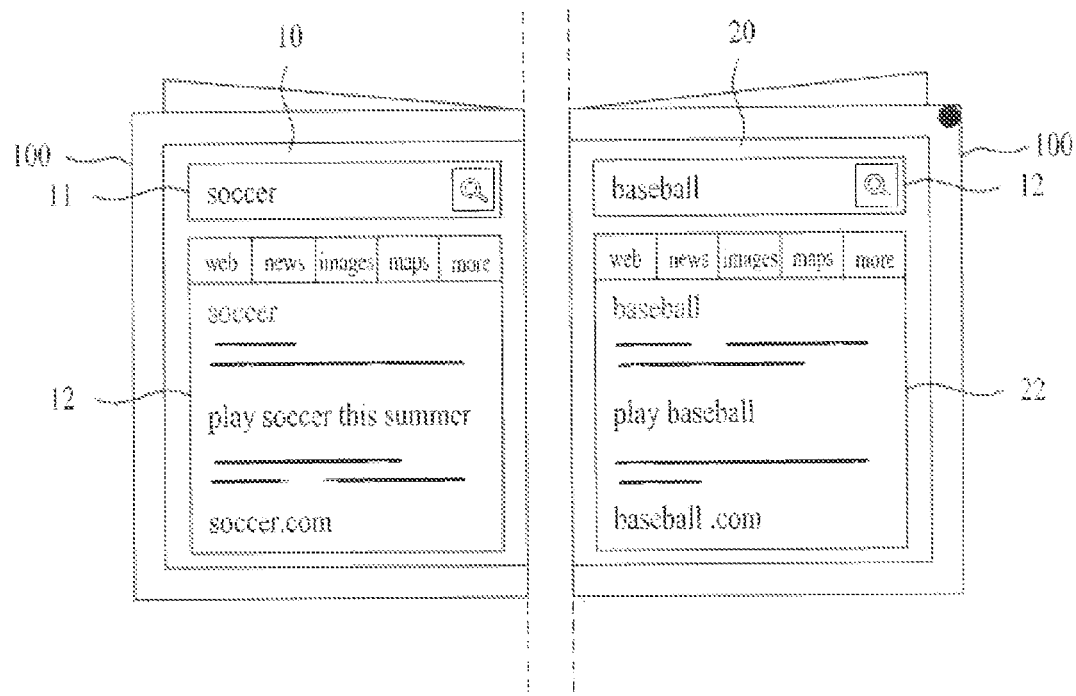
Figure 5C:
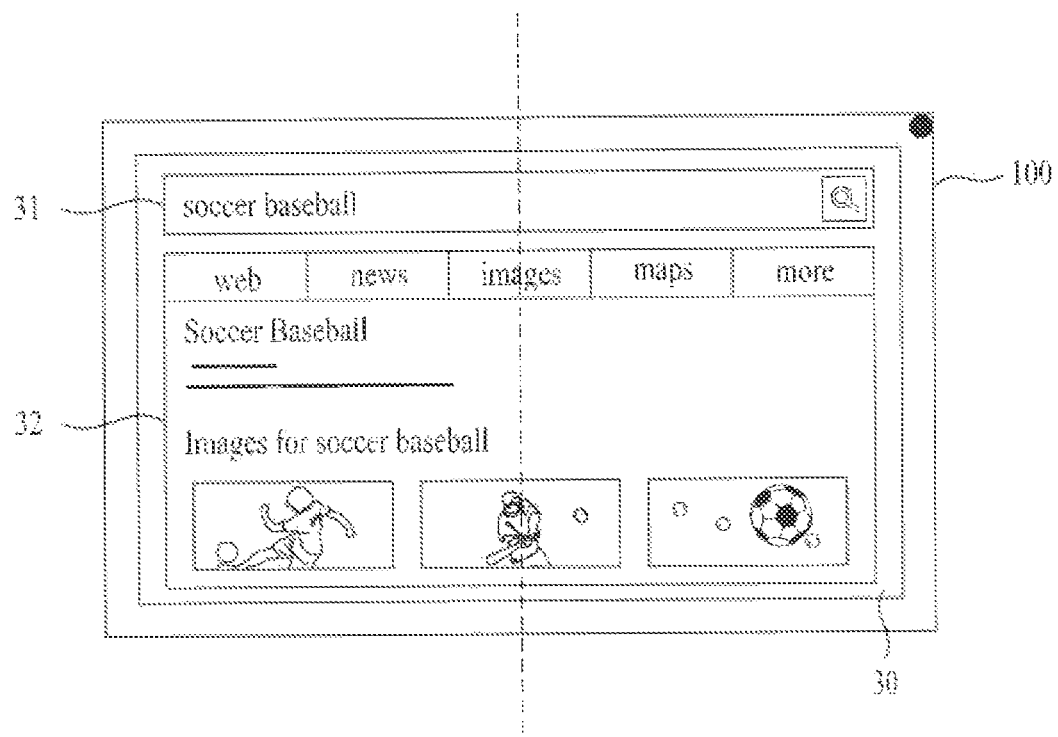

In more detail, the top of FIG. 5a illustrates a second method for allowing a foldable display device of a folded state to display first content and second content, and the bottom of FIG. 5a illustrates a second method for allowing a foldable display device of a unfolded state to display third content obtained by reorganizing the first content and the second content. Also, FIG. 5b illustrates a detailed embodiment of the top of FIG. 5a, and FIG. 5c illustrates a detailed embodiment of the bottom of FIG. 4a. Also, FIG. 5d illustrates another detailed embodiment of the top of FIG. 5a, and FIG. 5e illustrates another detailed embodiment of the bottom of FIG. 5a.

Figure 5D:
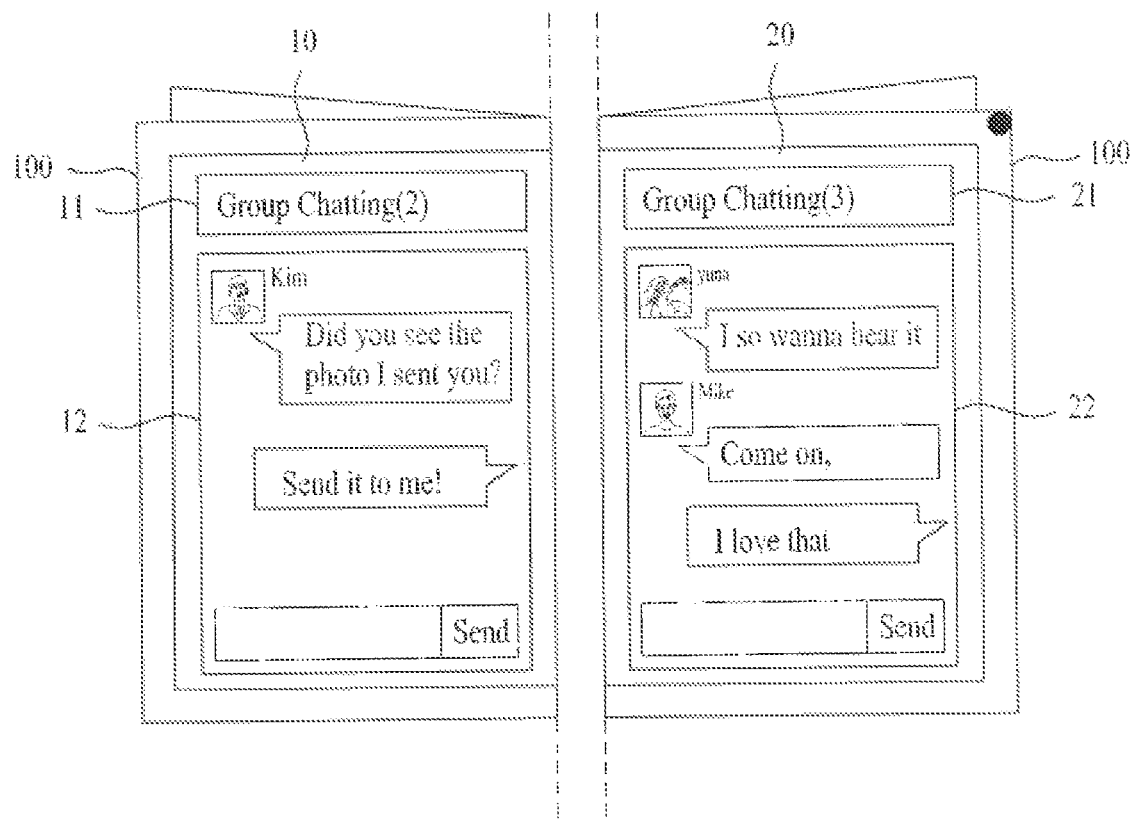
Figure 5E:
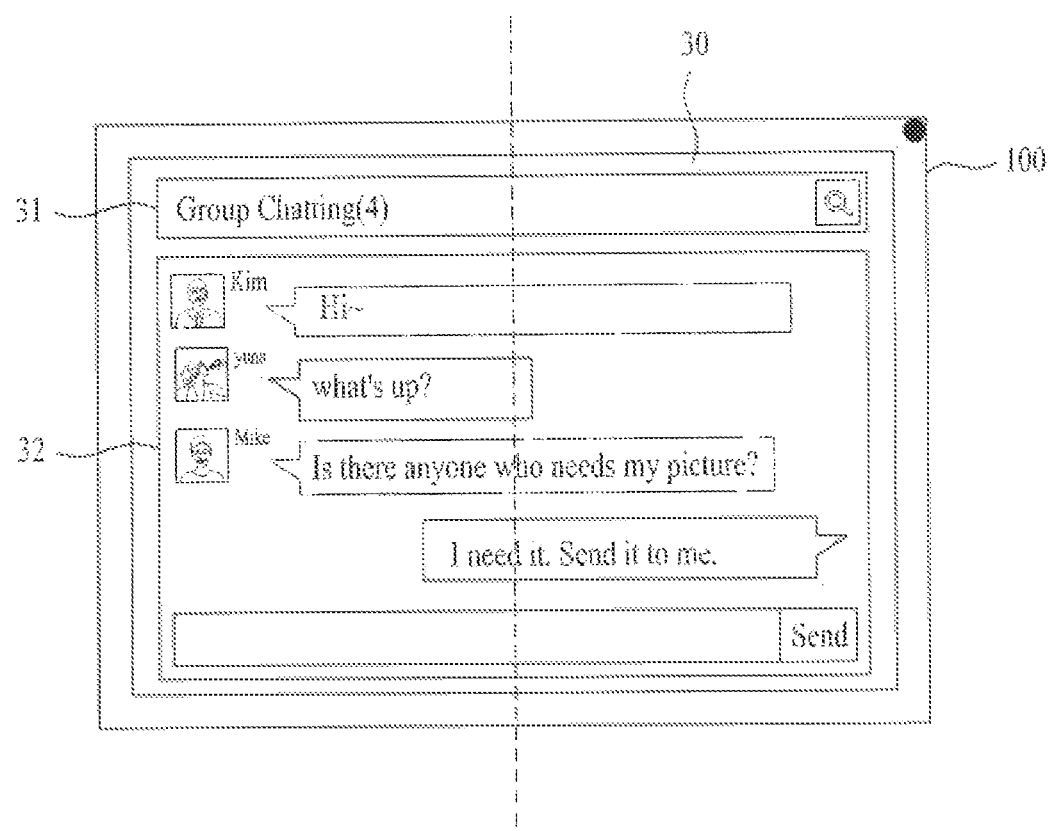

Referring to the top of FIG. 5a, FIG. 5b and FIG. 5d, the foldable display device 100 of the folded state may display first content provided from a first application on a first display region 10 and second content provided from a second application on a second display region 20.

In this case, the first application and the second application may be the applications which are previously installed in the foldable display device 100. For example, as shown in FIG. 5b, the first application and the second application may be search applications which are previously installed in the foldable display device 100. At this time, the first application and the second application may be search applications different from each other. For another example, as shown in FIG. 5d, the first application and the second application may be messenger applications which are previously installed in the foldable display device 100. At this time, the first application and the second application may be messenger applications different from each other. In this case, the messenger application may be at least one of a text messenger application, an audio messenger application, a video messenger application. Also, the video messenger application may include a video conference application.

In this case, each of the first content and the second content may include at least one part. For example, as shown in FIG. 5a, the first content may include a first part 11 and a second part 12, and the second content may include a first part 21 and a second part 22. At this time, as shown in FIG. 5b, if the first application and the second application are search applications, the first part 11 of the first content may represent a search window where a first search keyword is input, the second part of the first content may represent a search result for the first search keyword, the first part of the second content may represent a search window where a second search keyword is input, and the second part of the second content may represent a search result for the second search keyword. Also, as shown in FIG. 5d, if the first application and the second application are messenger applications, the first part of the first content may represent participants of a first chatting group, the second part of the first content may represent a chatting window of the first chatting group, the first part of the second content may represent participants of a second chatting group, and the second part of the second content may represent a chatting window of the second chatting group.

Referring to the bottom of FIG. 5a, FIG. 5c, and FIG. 5e, if the foldable display device 100 of the folded state is unfolded, the foldable display device 100 may display third content provided form a third application on a third display region 30.

In this case, the third application may be the application generated using at least one of the first application and the second application. For example, as shown in FIG. 5c, if the first application and the second application are search applications, the third application may be the merged search application of the first application and the second application. For another example, as shown in FIG. 5e, if the first application and the second application are messenger applications, the third application may be the merged messenger application of the first application and the second application.

The third application may generate a first merged part 31 by merging the first part 11 of the first content and the second part 21 of the second content and generate a second merged part 32 by merging the second part 12 of the first content and the second part 22 of the second content, thereby generating the third content obtained by reorganizing the first content and the second content. In other words, the third content may be the content that includes a first merged part 31 of the first part 11 of the first content and the first part 21 of the second content and a second merged part 32 of the second part 12 of the first content and the second part 22 of the second content.

At this time, as shown in FIG. 5c, if the first application and the second application are search applications, the third application may generate the third content, which is obtained by reorganizing the first content and the second content, by generating the first merged part 31 indicating a search window where a merged search keyword, which includes a first keyword input to the first part 11 of the first content and a second search keyword input to the first part 21 of the second content, is input and generating the second merged part 32 indicating a search result of the merged search keyword. However, the aforementioned example is only one embodiment of the third content, and the foldable display device 100 of the present specification is not limited to such embodiment.

At this time, as shown in FIG. 5e, if the first application and the second application are messenger applications, the third application may generate the third content, which is obtained by reorganizing the first content and the second content, by generating the first merged part 31 indicating participants of a merged chatting group, which includes the participants of the first chatting group included in the first part 11 of the first content and the participants of the second chatting group included in the first part 21 of the second content, and generating the second merged part 32 indicating a chatting window of the merged chatting group. However, the aforementioned example is only one embodiment of the third content, and the foldable display device 100 of the present specification is not limited to such embodiment.

FIG. 6 is a diagram illustrating a method for allowing a foldable display device to display contents if the foldable display device according to the third embodiment of the present specification is unfolded.

Figure 6B:
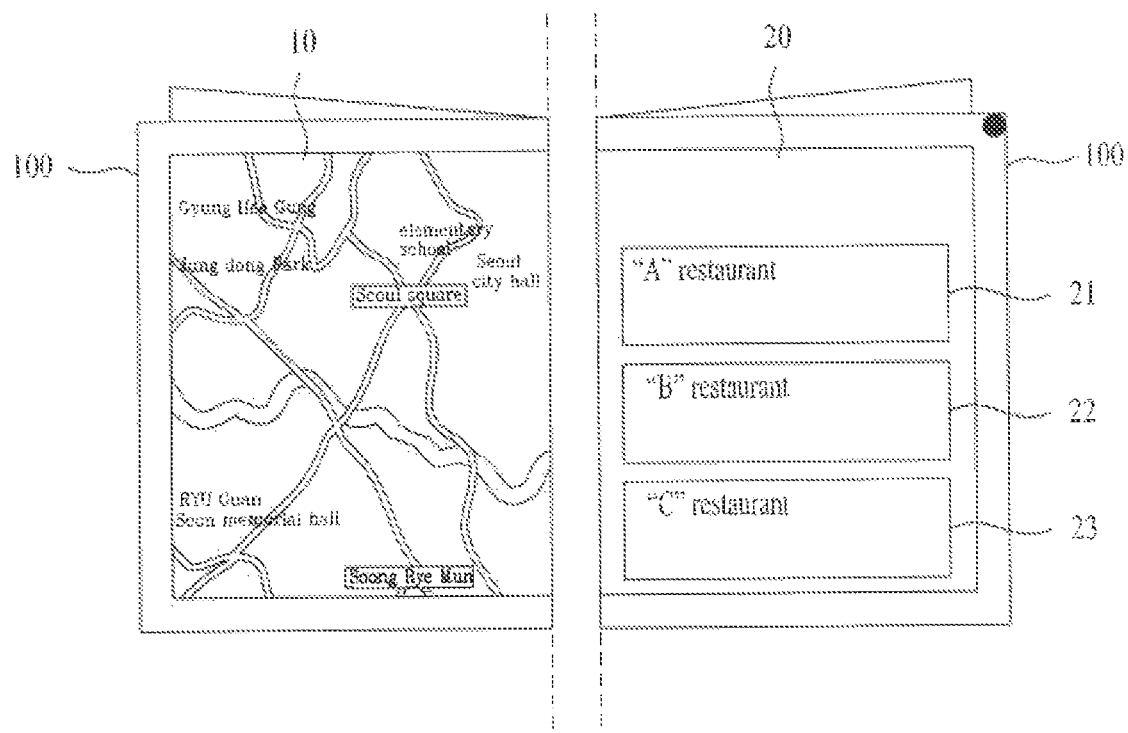
Figure 6C:
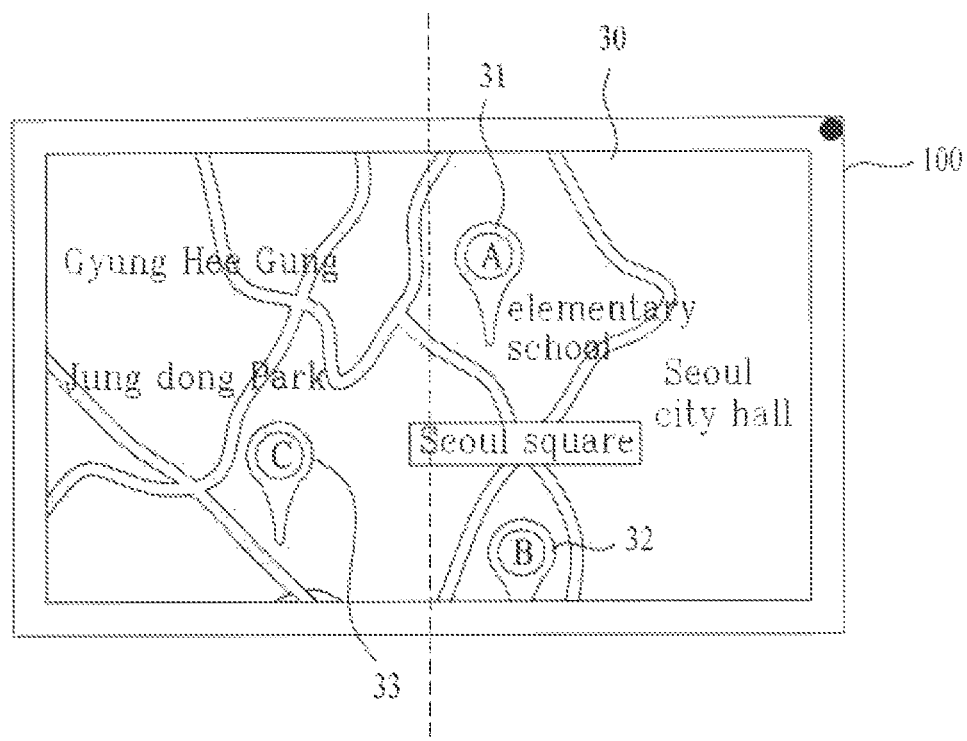

In more detail, the top of FIG. 6a illustrates a third method for allowing a foldable display device of a folded state to display first content and second content, and the bottom of FIG. 6a illustrates a third method for allowing a foldable display device of a unfolded state to display third content obtained by reorganizing the first content and the second content. Also, FIG. 6b illustrates a detailed embodiment of the top of FIG. 6a, and FIG. 6c illustrates a detailed embodiment of the bottom of FIG. 6a.

Referring to the top of FIG. 6a and FIG. 6b, the foldable display device 100 of the folded state may display first content provided from a first application on a first display region 10 and second content provided from a second application on a second display region 20.

In this case, the first application and the second application may be the applications which are previously installed in the foldable display device 100. For example, as shown in FIG. 6b, the first application may be a map application which is previously installed in the foldable display device 100, and the second application may be a search application which is previously installed in the foldable display device 100.

In this case, each of the first content and the second content may include at least one part. For example, as shown at the top of FIG. 6a, the second content may include a first part 21 to a third part 23. At this time as shown in FIG. 6b, if the first application is a map application and the second application is a search application, the first content may include a location indicator indicating a current location of the foldable display device and a map image, and the second content may include the first part 21 indicating a first search result, the second part 22 indicating a second search result, and the third part 23 indicating a third search result.

Referring to the bottom of FIG. 6a and FIG. 6c, if the foldable display device 100 of the folded state is unfolded, the foldable display device 100 may display third content provided form a third application on a third display region 30. In this case, the third application may be the application generated using at least one of the first application and the second application. For example, if the first application is the map application, the third application may be a new map application generated using the first application. Also, the third application may be the same map application as the first application.

At this time, the third application may generate the third content, which is obtained by reorganizing the first content and the second content, by displaying the indicator corresponding to each part of the second content at a specific location on the first content. For example, as shown at the bottom of FIG. 6a, the third application may generate the third content, which is obtained by reorganizing the first content and the second content, by displaying a first location indicator 31 corresponding to the first part 21 of the second content at a first location on the first content, displaying a second location indicator 32 corresponding to the second part 22 of the second content at a second location on the first content, and displaying a third location indicator 33 corresponding to the third part 23 of the second content at a third location on the first content. In other words, the third content includes the first content, and may be the content generated by displaying the first location indicator 31 corresponding to the first part 21 of the second content at the first location of the first content, displaying the second location indicator 32 corresponding to the second part 22 of the second content at the second location of the first content, and displaying the third location indicator 33 corresponding to the third part 23 of the second content at the third location of the first content.

At this time, as shown in FIG. 6c, if the first application is a map application and the second application is a search application, the third application may further include a map image and a location indicator of the first content. Also, the third content may display the first indicator 31 corresponding to the first part 21 of the second content at a first location on the map image, display the second indicator 32 corresponding to the second part 22 of the second content at a second location on the map image, and display the third indicator 33 corresponding to the third part 23 of the second content at a third location on the map image. In this case, the first location may be determined on the basis of the first search result included in the first part 21 of the second content, the second location may be determined on the basis of the second search result included in the second part 22 of the second content, and the third location may be determined on the basis of the third search result included in the third part 22 of the second content. However, the aforementioned example is only one embodiment of the third content, and the foldable display device 100 of the present specification is not limited to such embodiment.

Figure 6D:
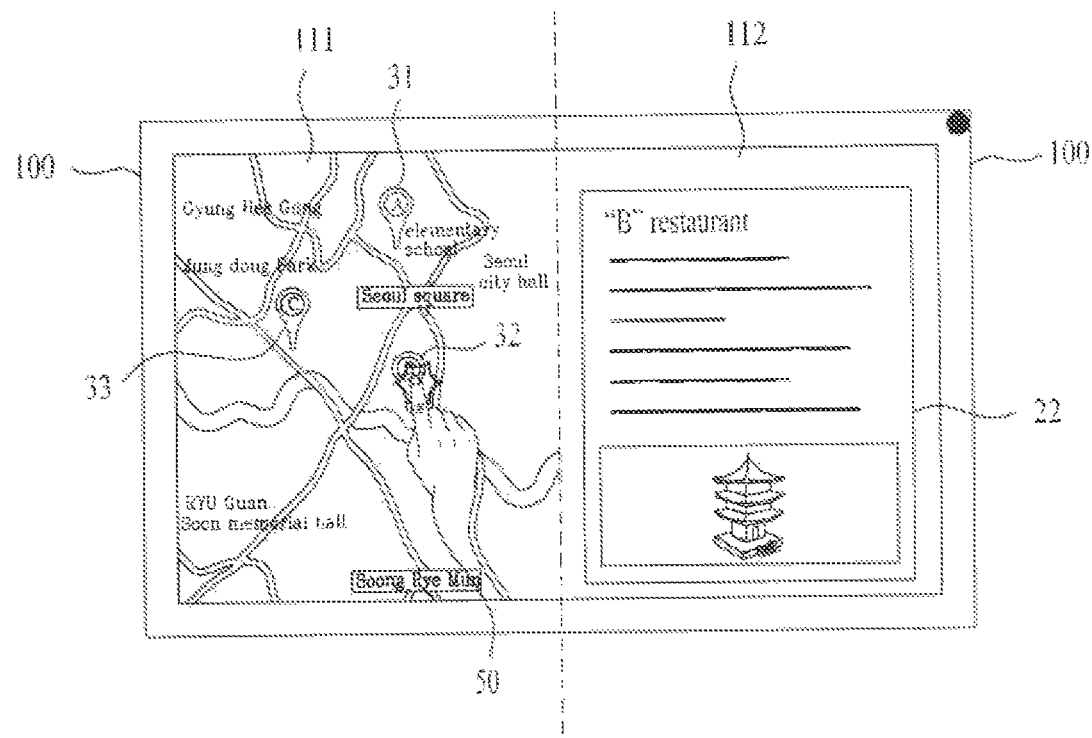

Referring to FIG. 6d, if a user input 50 for at least one indicator is detected in the unfolded state, the foldable display device may display the third content in a first region 111 of the third display region and display a corresponding part of the second content corresponding to the detected indicator in a second region 112 of the third display region. For example, as shown in FIG. 6d, if the user input 50 for the second indicator 32 is detected in the unfolded state, the foldable display device 100 may display the third content in the first region 111 of the third display region and display the second part 22 of the second content corresponding to the second indicator in the second region 112 of the third display region. At this time, the foldable display device 100 may again display a full version of the second search result corresponding to the second part 22 of the second content in the second region 112.

FIG. 7 is a diagram illustrating a method for allowing a foldable display device to display contents if the foldable display device according to the fourth embodiment of the present specification is unfolded.

Figure 7A:
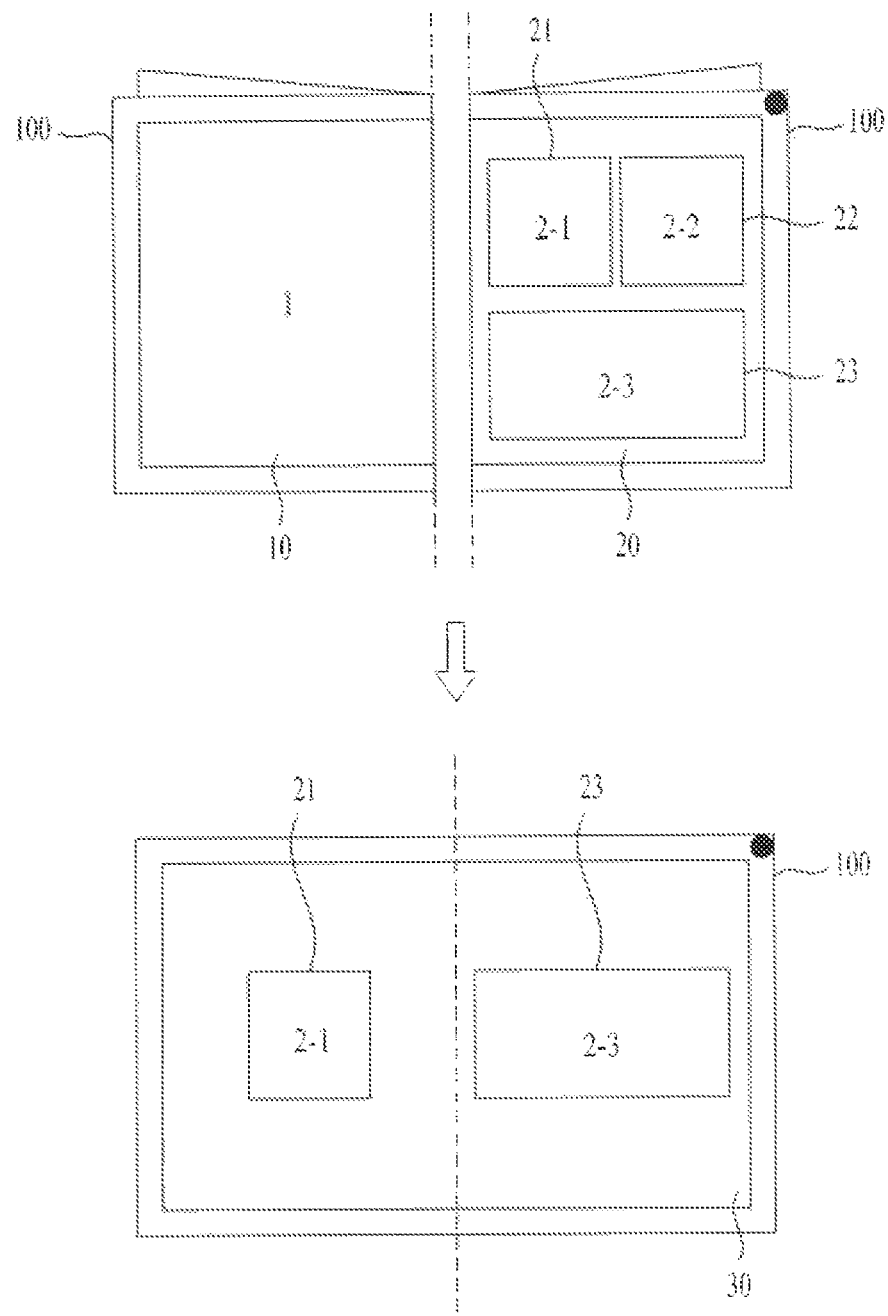
FIGS. 7A-7B are diagrams illustrating a method for allowing a foldable display device to display contents if the foldable display device according to the fourth embodiment of the present specification is unfolded.

In more detail, the top of FIG. 7a illustrates a fourth method for allowing a foldable display device of a folded state to display first content and second content, and the bottom of FIG. 7a illustrates a fourth method for allowing a foldable display device of a unfolded state to display third content obtained by reorganizing the first content and the second content. Also, FIG. 7b illustrates a detailed embodiment of the top of FIG. 7a, and FIG. 7c illustrates a detailed embodiment of the bottom of FIG. 7a.

Figure 7B:
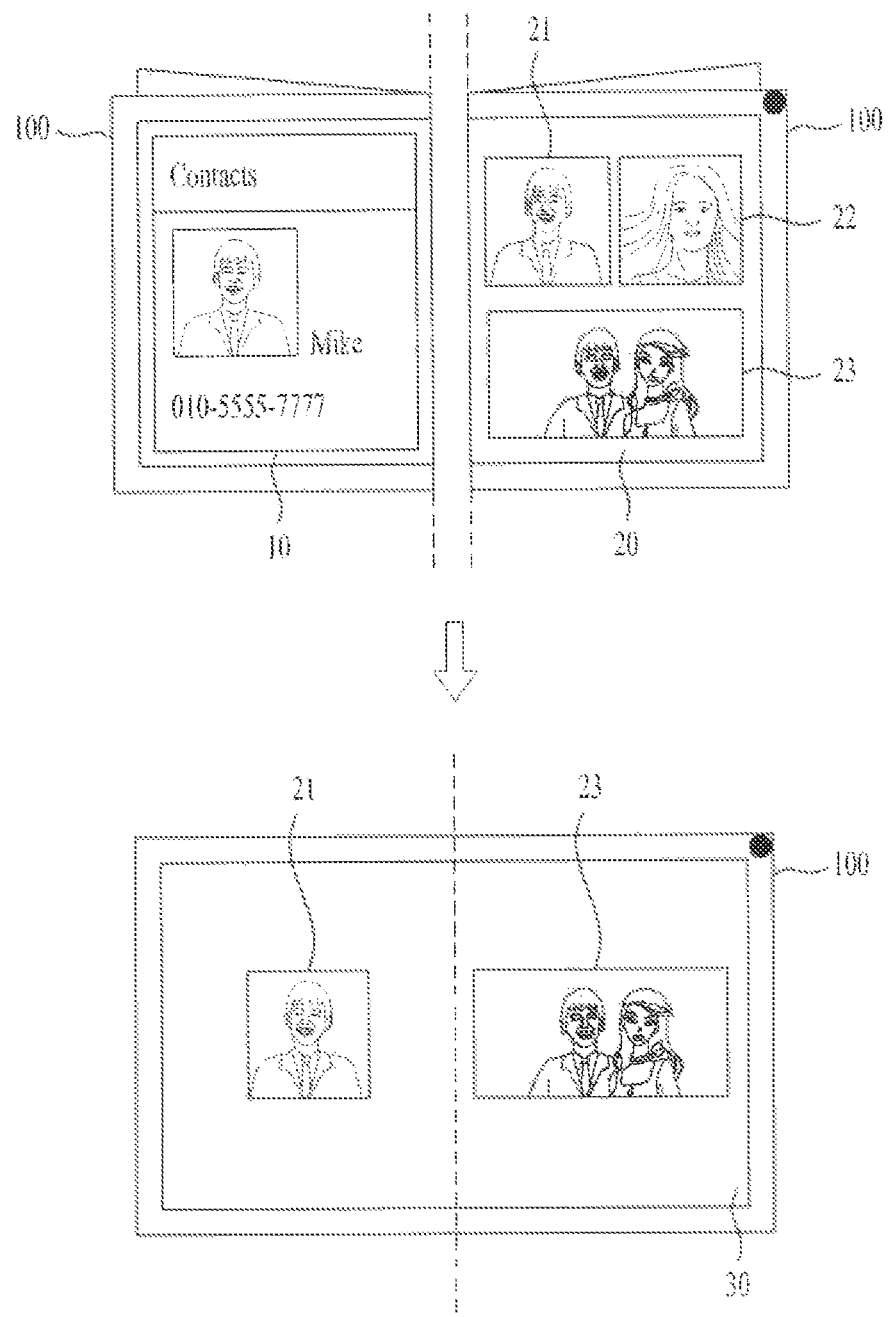

Referring to the top of FIG. 7a and the top of FIG. 7b, the foldable display device 100 of the folded state may display first content provided from a first application on a first display region 10 and second content provided from a second application on a second display region 20. At this time, as shown, the second content may include a first part to a third part.

In this case, the first application and the second application may be the applications which are previously installed in the foldable display device 100. For example, as shown at the top of FIG. 7b, the first application may be a contact address application which is previously installed in the foldable display device 100, and the second application may be a photo gallery application which is previously installed in the foldable display device 100.

In this case, each of the first content and the second content may include at least one part. For example, as shown at the top of FIG. 7a, the second content may include a first part 21 to a third part 23. At this time as shown at the top of FIG. 7b, if the first application is a contact address application and the second application is a photo gallery application, the first content may include at least one contact address, and the second content may include at least one photo.

Referring to the bottom of FIG. 7a and the bottom of FIG. 7b, if the foldable display device 100 of the folded state is unfolded, the foldable display device 100 may display third content provided form a third application on a third display region 30. In this case, the third application may be the application generated using at least one of the first application and the second application. For example, if the first application is the photo gallery application, the third application may be a new photo gallery application generated using the second application. Also, the third application may be the same photo gallery application as the second application.

At this time, the third application may generate the third content, which is obtained by reorganizing the first content and the second content, by selecting parts only of the second content provided from the second application on the basis of the first content provided from the first application and providing the selected parts as the third content. For example, as shown at the bottom of FIG. 7a, the third application may generate the third content, which is obtained by reorganizing the first content and the second content, by selecting the first part and the third part only which are the parts of the second content, on the basis of the first content and providing the selected parts as the third content.

At this time, as shown at the bottom of FIG. 7b, if the first application is the contact address application and the second application is the photo gallery application, the third application may generate the third content, which is obtained by reorganizing the first content and the second content, by selecting a photo only of a person corresponding to at least one contact address included in the first content, from photos included in the second content, and providing the selected photo as the third content. For example, the third application may select the first part 31 and the third part 33 only of the second content, which are photos of a person corresponding to a first contact address included in the first content, from photos included in the second content, and providing the selected photos as the third content.

Figure 8:
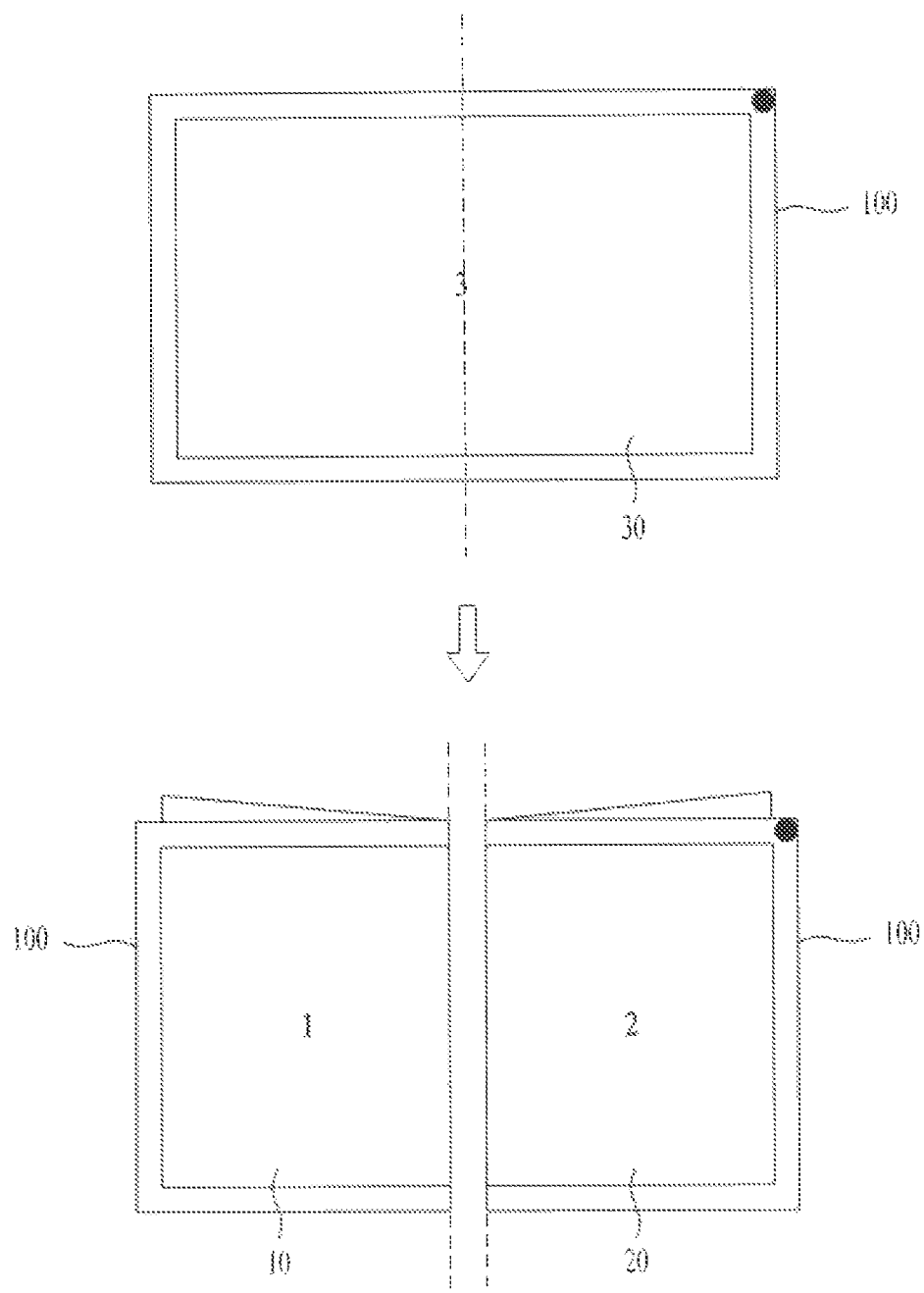
FIG. 8 is a diagram illustrating a method for allowing a foldable display device to display contents if the foldable display device according to one embodiment of the present specification is folded.

FIG. 8 is a diagram illustrating a method for allowing a foldable display device to display contents if the foldable display device according to one embodiment of the present specification is folded. In more detail, the top of FIG. 8 illustrates a method for allowing a foldable display device of an unfolded state to display contents, and the bottom of FIG. 8 illustrates a method for allowing a foldable display device of a folded state to display contents if the foldable display device of the unfolded state is folded.

Referring to the top of FIG. 8, the foldable display device 100 of the unfolded state may display third content provided from a third application on a third display region 30. Since this is the same as the disclosure described with reference to FIGS. 4 to 7, its detailed description will be omitted.

Referring to the bottom of FIG. 8, if the foldable display device 100 of the unfolded state is folded, the foldable display device 100 may re-split the third display region 30 into a first display region 10 and a second display region 20.

Also, the foldable display device 100 may display a first split content provided from a first application on the first display region 10 and a second split content provided from a second application on the second display region 20. In this case, the first split content may correspond to the content displayed in a first region of the third display region 30 before the foldable display device 100 is folded, and the second split content may correspond to the content displayed in a second region of the third display region 30 before the foldable display device 100 is folded. For example, the first split content may include the content displayed in the first region of the third display region 30 when the foldable display device 100 is folded, and the second split content may include the content displayed in the second region of the third display region 30 when the foldable display device 100 is folded. At this time, the first split content may be the same as the first content, and the second split content may be the same as the second content. In this case, the first region of the third display region 30 may correspond to the first display region 10, and the second region of the third display region 30 may correspond to the second display region 20.

FIG. 9 is a diagram illustrating a method for allowing a foldable display device to display contents if the foldable display device according to another embodiment of the present specification is folded.

Figure 9A:
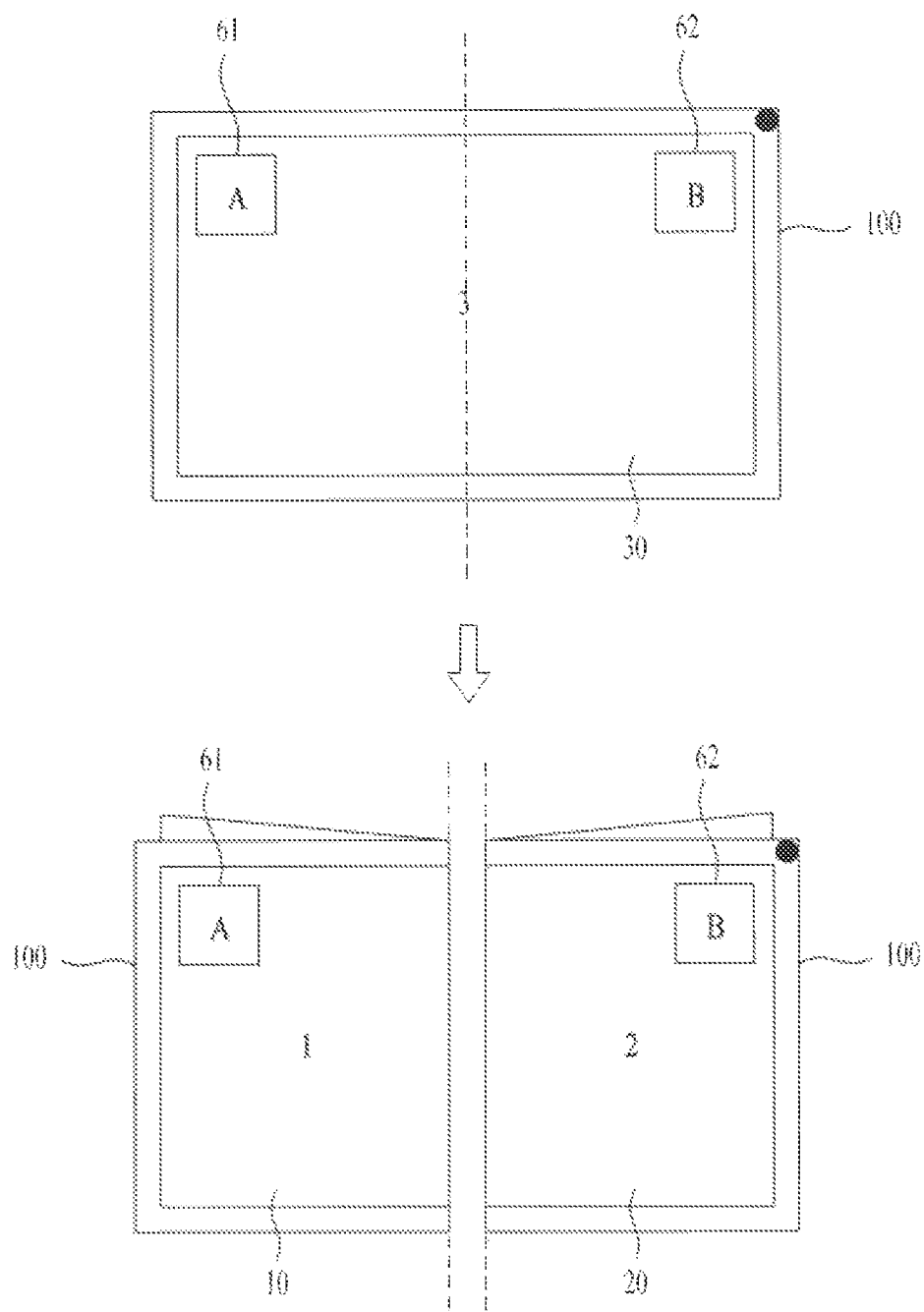

Referring to the top of FIG. 9a, the foldable display device 100 of the unfolded state may display third content provided from a third application on a third display region 30. At this time, the third content may include at least one movable object. For example, as shown in FIG. 9a, the third content may include a first movable object 61 displayed in a first region of the third display region 30, and a second movable object 62 displayed in a second region of the third display region 30.

Referring to the bottom of FIG. 9a, if the foldable display device 100 of the unfolded state is folded, the foldable display device 100 may display a first split content provided from a first application on a first display region 10 and a second split content provided from a second application on a second display region 20. At this time, the first split content may include the first movable object 61 located in the first region of the third display region 30 when the foldable display device 100 is folded, and the second split content may include the second movable object 62 located in the second region of the third display region 30 when the foldable display device 100 is folded.

Referring to the left side on the top of FIG. 9b and the left side on the top of FIG. 9c, the foldable display device 100 may display first content provided from the first application on the first display region 10 and second content provided from the second application on the second display region 20.

In this case, as shown at the left side on the top of FIG. 9c, the first application and the second application may be video chatting applications. At this time, the first application and the second application may be video chatting applications different from each other.

In this case, if the first application and the second application are video chatting applications, the first content may be the content for first video chatting provided from the first application, and the second content may be the content for second video chatting provided from the second application. For example, as shown at the top of the left side of FIG. 9c, the first content may display an image of the other party of the first video chatting in a first main region of the first display region 10, and may display a user image of the first video chatting in a first sub region of the first display region 10. Also, the second content may display an image of another party of the second video chatting in a second main region of the second display region 20, and may display an image of other party of the second video chatting in a second sub region of the second display region 20.

In this case, the first content may include the first movable object 61, and the second content may include the second movable object 62. For example, as shown at the top of the left side of FIG. 9c, the first content may include the first movable object 61 constituting the sub region of the first display region 10, and the second content may include the second movable object 62 constituting the sub region of the second display region 20. As a result, the sub region of the first display region 10 and the sub region of the second display region 20 may be moved respectively.

Referring to the right side on the top of FIG. 9b and the right side on the top of FIG. 9c, if the foldable display device of the folded state is unfolded, the foldable display device of the unfolded state may display the third content provided from the third application on the third display region 30.

At this time, as shown at the right side on the top of FIG. 9c, the third application may be the video chatting application generated using the first application and the second application. In this case, the third application may provide the third content, which is obtained by reorganizing the first content and the second content, by providing merged video chatting of first video chatting provided from the first application and second video chatting provided from the second application. Namely, the third content may be the content for the merged video chatting where the first video chatting provided from the first application and the second video chatting provided from the second application are merged. In other words, the merged video chatting of the third content may allow all the participants who join in the first video chatting and the second video chatting to perform video chatting together.

Also, the third content may include the first movable object 61 and the second movable object 62. In this case, the foldable display device of the unfolded state may display the first movable object 61, which is located in the first display region 10 when the foldable display device is folded, in the first region of the third display region 30, and may display the second movable object 62, which is located in the second display region 20 when the foldable display device is folded, in the second region of the third display region 30.

Also, the foldable display device of the unfolded state may detect the user input 50. The foldable display device of the unfolded state may select the movable object on the basis of the user input 50. For example, as shown at the right side on the top of FIG. 9b, the foldable display device of the unfolded state may select the second movable object 62 on the basis of a touch input of a user. For example, as shown at the right side on the top of FIG. 9c, the foldable display device of the unfolded state may select the second sub region, which includes the second movable object 62, on the basis of the touch input of the user.

Referring to the right side on the bottom of FIG. 9b and the right side on the bottom of FIG. 9c, the foldable display device of the unfolded state may detect that the selected movable object is moved from the first region to the second region within the third display region 30 or from the second region to the first region within the third display region 30 on the basis of the user input 50. For example, as shown at the right side on the bottom of FIG. 9b, the foldable display device of the unfolded state may detect that the selected second movable object 62 is moved from the second region to the first region within the third display region 30 on the basis of the touch input of the user. For example, as shown at the right side on the bottom of FIG. 9c, the foldable display device of the unfolded state may detect that the second sub region of the selected second movable object 62 is moved from the second region to the first region within the third display region 30.

Referring to the left side on the bottom of FIG. 9b and the left side on the bottom of FIG. 9c, if the foldable display device 100 of the unfolded state is folded, the foldable display device 100 of the folded state may display the first split content provided from the first application on the first display region 10 and display the second split content provided from the second application on the second display region 20. Also, the foldable display device of the folded state may provide the first split content to the first display region as a first mode and provide the second split content to the second display region as a second mode. In this case, the first mode and the second mode may be any one of a text chatting mode, an audio chatting mode and a video chatting mode, and may be modes different from each other.

At this time, the first split content may include the movable object located in the first region of the third display region 30 when the foldable display device is folded, and the second split content may include the movable object located in the second region of the third display region 30 when the foldable display device is folded. For example, as shown at the left side on the bottom of FIG. 9b, the first split content may include the first movable object 61 and the second movable object 62, which are located in the first region of the third display region 30 when the foldable display device is folded.

For example, as shown at the left side on the bottom of FIG. 9c, the first split content may include the first sub region of the first movable object 61 located in the first region of the third display region 30 and the second sub region of the second movable object 62 when the foldable display device is folded. In other words, the first split content may be the content for first chatting, which includes a user, a participant displayed in the first main region, a participant displayed in the first sub region, and a participant displayed in the second sub region. Also, the first split content may be the content for second chatting, which includes a user and a participant displayed in the first main region.

Figure 10:
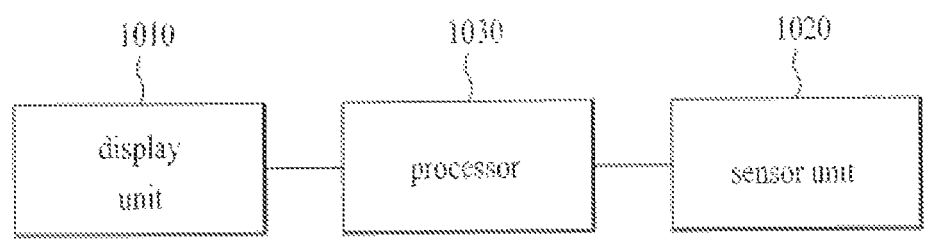
FIG. 10 is a block diagram illustrating a foldable display device according to one embodiment of the present specification.

FIG. 10 is a block diagram illustrating a foldable display device according to one embodiment of the present specification.

Referring to FIG. 10, the foldable display device may include a display unit, a sensor unit, and a processor.

In this specification, the display unit 1010 may include a first display region and a second display region. Also, the first display region may be supported by a first body, and the second display region may be supported by a second body. In this case, the first body and the second body may be included in the display unit. Also, the first display region and the second display region may be located on a first surface of the foldable display device, wherein the first surface may be a front surface of the foldable display device.

For example, the foldable display device may include one display unit. In this case, the first display region and the second display region may be provided in one display unit.

Also, the display unit 1010 may include a foldable display screen or a bendable display screen. The display unit 1010 may be folded or bent in half on the basis of a folding axis. The display unit 1010 may be folded asymmetrically on the basis of the folding axis. The display unit 1010 may be folded in a direction to which the first display region and the second display region are externally exposed.

The display unit 1010 may include at least one of an organic light emitting diode (OLED), a liquid crystal display (LCD), an electronic ink, and a flexible display. In the unfolded state, the display unit 1010 may display images in each region split by the folding axis in a front direction. Also, if at least one region is folded in the unfolded state, the display unit 1010 may be switched to the folded state.

The sensor unit 1020 may sense a periphery environment of the foldable display device by using at least one sensor provided in the foldable display device, and may forward the sensed result to the processor 1030 as a signal type. Also, the sensor unit 1020 may sense a user input and forward a signal based on the sensed result to the processor 1030.

Also, the sensor unit 1020 may include at least one sensing means. In one embodiment, the at least one sensing means may include a gravity sensor, a terrestrial magnetism sensor, a motion sensor, a gyroscope sensor, an acceleration sensor, an infrared sensor, an inclination sensor, a brightness sensor, an altitude sensor, a smell sensor, a temperature sensor, a depth sensor, a pressure sensor, a bending sensor, an audio sensor, a video sensor, a global positioning system (GPS) sensor, a touch sensor, and a grip sensor.

Also, the sensor unit 1020 refers to the aforementioned various sensing means, and may sense various inputs of a user and the environment of the foldable display device and forward the sensed result to the processor 1030, whereby the processor 1030 may perform the operation based on the sensed result. Also, the aforementioned sensors may be included in the foldable display device as separate elements, or may be incorporated into at least one element.

In this specification, the sensor unit 1020 may detect that the foldable display device is folded or unfolded. The sensor unit 1020 may detect that the foldable display device is folded or unfolded by sensing a folding angle of the foldable display device. In this case, the folding angle may be the angle made by an inner angle of the foldable display unit.

Also, the sensor unit 1020 may detect the user input for the foldable display device. The sensor unit 1020 may a touch input of the user for the display unit. The sensor unit 1020 may sense the touch input of the user by using a decompression or electrostatic touch sensor. The touch sensor for each region may be activated or deactivated for each region by the processor 1030. The sensor unit 1020 may forward information on the sensed touch input to the controller. The aforementioned display unit 1010 and the touch sensor of the sensor unit 1020 may be designed in such a manner that they are incorporated into a touch sensitive display unit in accordance with the embodiment.

Next, the processor 1030 may control each unit of the foldable display device and control data transmission and reception between the respective units. The processor 1030 may implement contents received through data communication or contents stored in a storage unit.

In this specification, the processor 1030 may recognize the signal forwarded from at least one of the sensor unit 1020 and the display unit 1010 and control the foldable display device in accordance with the signal.

In more detail, the processor 1030 may detect the signal through at least one of the sensor unit 1020 and the display unit 1010 among the plurality of signals forwarded from the units of the foldable display device. Namely, the processor 1030 may detect the input signal received from a specific sensor, among many signals received therein, and perform the operation corresponding to the detected signal. Hereinafter, if each step or operation performed by the foldable display device starts or is performed through an external input signal, it is to be understood that the procedure of generating the external input signal is included in the aforementioned description.

In the folded state of the foldable display device, the processor 1030 may display the first content provided from the first application on the first display region and display the second content provided from the second application on the second display region. In this case, the first application and the second application may be the applications which are installed in the foldable display device. Since the method for allowing the processor to display the first content and the second content in the folded state has been described in detail with reference to FIG. 2, its detailed description will be omitted.

Also, if the foldable display device is unfolded, the processor 1030 may generate the third display region by merging the first display region and the second display region, and may generate the third application by using at least one of the first application and the second application. Also, the processor 1030 may display the third content provided from the third application on the third display region. In this case, the third content may be the content obtained by reorganizing the first content and the second content. Since the method for allowing the third application to provide the third content by reorganizing the first content and the second content has been described with reference to FIGS. 4 to 7, its detailed description will be omitted.

Also, if the foldable display device of the unfolded state is folded, the processor may re-split the third display region into the first display region and the second display region. Also, the processor may display the first split content provided from the first application on the first display region and display the second split content provided from the second application on the second display region. In this case, the first split content may correspond to the content displayed in the first region of the third display region when the foldable display device is folded, and the second split content may correspond to the content displayed in the second region of the third display region when the foldable display device is folded. Also, the first split content may be the same content as the first content, and the second split content may be the same content as the second content. Since the method for allowing the processor to display the first split content and the second split content in the folded state has been described in detail with reference to FIGS. 8 and 9, its detailed description will be omitted.

Also, the foldable display device is shown in FIG. 10 as a block diagram according to one embodiment. In FIG. 10, respective split blocks are shown to logically identify the elements of the digital device. Accordingly, the aforementioned elements of the device may be provided as one chip or a plurality of chips in accordance with design of the device.

In one embodiment of the present specification, the operations performed by the foldable display device may be controlled by the processor. For convenience, in the drawings and the aforementioned description, these operations are performed and controlled by the foldable display device.

Figure 11:
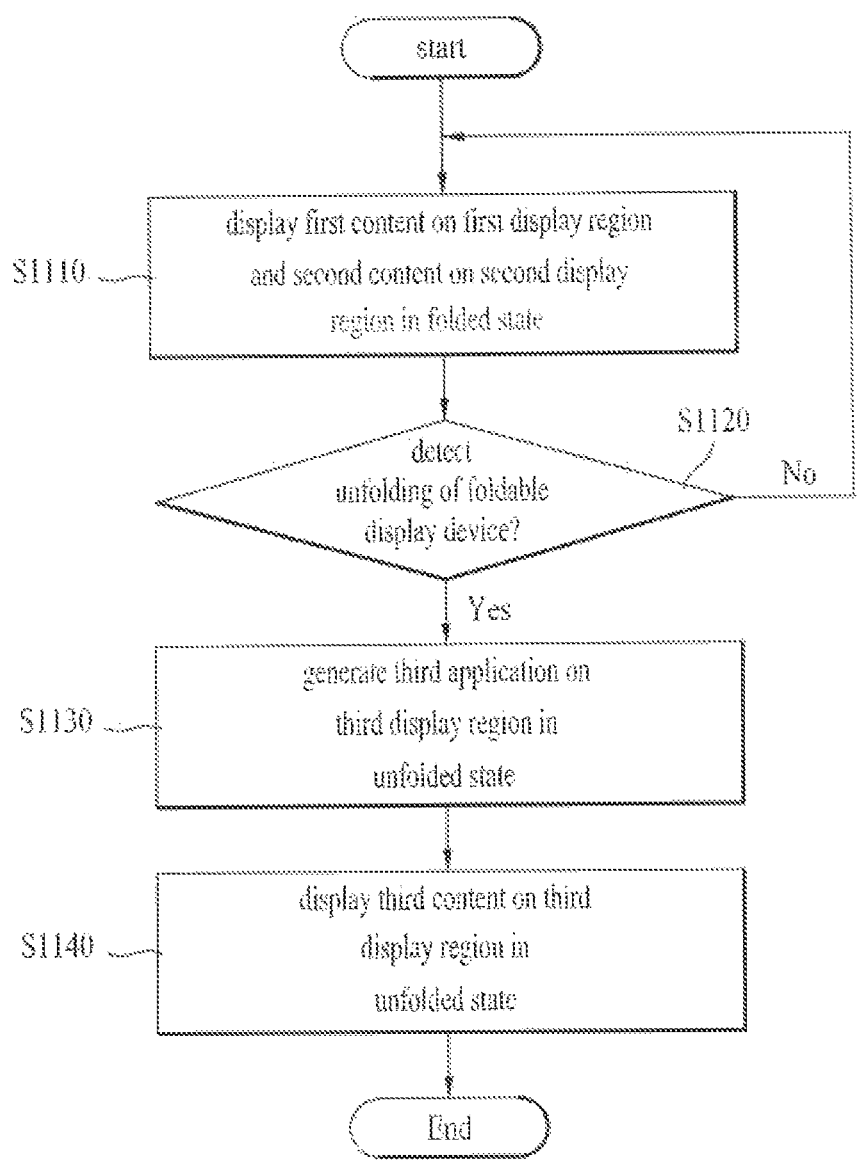
FIG. 11 is a flow chart illustrating a method for controlling a foldable display device according to one embodiment of the present specification.

FIG. 11 is a flow chart illustrating a method for controlling a foldable display device according to one embodiment of the present specification. Hereinafter, the repeated description of the description in FIGS. 1 to 10 will be omitted.

Referring to FIG. 11, in the folded state, the foldable display device may display first content provided from a first application on a first display region and display second content provided from a second application on a second display region (S1110). In this case, the first application and the second application may be different from each other. For example, the first application may be a map application, and the second application may be a search application. Also, the first application and the second application may be the same applications as each other. For example, the first application and the second application may be the same messenger applications.

Next, the foldable display device of the folded state may detect its unfolding (S1120). At this time, the foldable display device may detect its folding or unfolding through a sensor unit. The sensor unit may detect that the foldable display device is folded or unfolded, by sensing a folding angle of the foldable display device. In this case, the folding angle may be the angle made by an inner angle of the foldable display device. If unfolding of the foldable display device is not detected, the foldable display device may continue to display the first content and the second content.

Next, if unfolding of the foldable display device is detected, the foldable display device of the unfolded state may generate a third display region by merging the first display region and the second display region, and may generate a third application by using at least one of the first application and the second application (S1130). In this case, the third application may mean the application that may newly generate third content by reorganizing the first content displayed in the first display region when the foldable display device is unfolded and the second content displayed in the second display region when the foldable display device is unfolded. Since the method for allowing the third application to provide the third content by reorganizing the first content and the second content has been described with reference to FIGS. 4 to 7, its detailed description will be omitted.

Next, the foldable display device of the unfolded state may display the third content provided from the third application on the third display region (S1130). In this case, the third content may be the content generated by reorganizing the first content and the second content.

Figure 12:
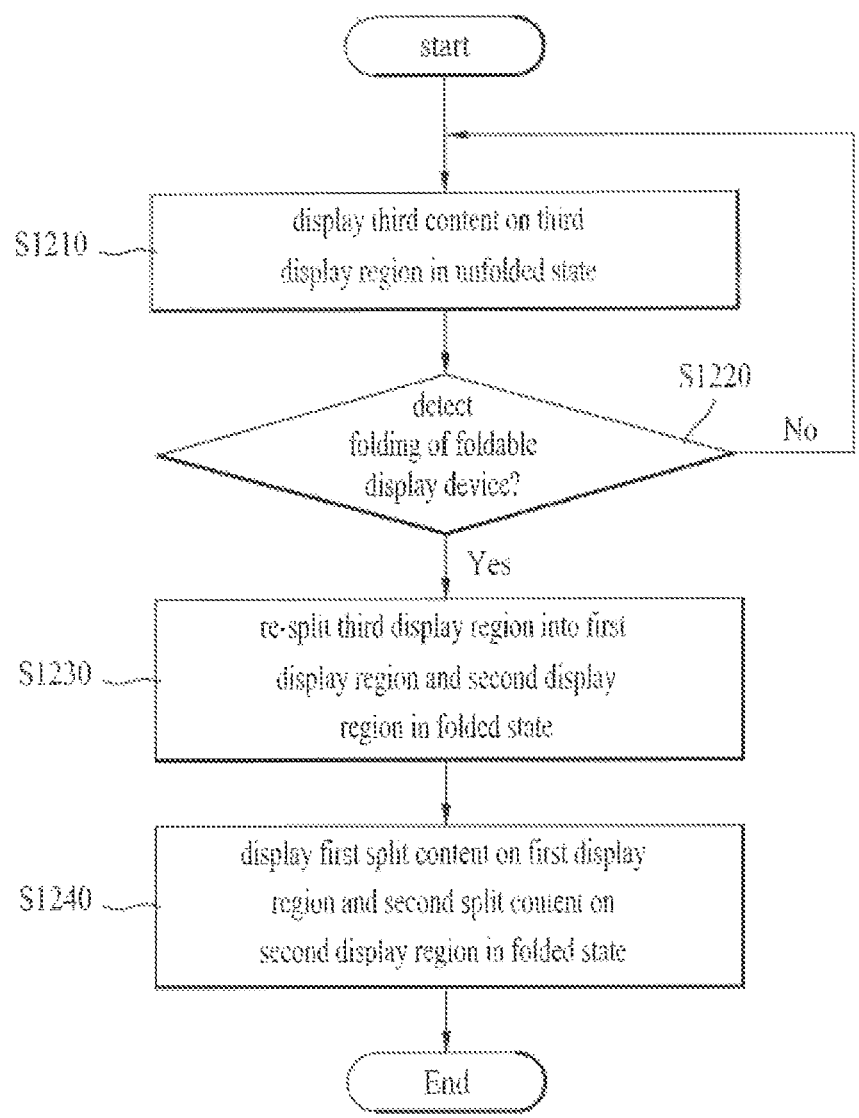
FIG. 12 is a flow chart illustrating a method for controlling a foldable display device according to another embodiment of the present specification.

FIG. 12 is a flow chart illustrating a method for controlling a foldable display device according to another embodiment of the present specification. Hereinafter, the repeated description of the description in FIGS. 1 to 11 will be omitted.

Referring to FIG. 12, the foldable display device of the unfolded state may display third content provided from a third application on a third display region (S1210). Since this is the same description as that in FIGS. 4 to 7, its detailed description will be omitted.

Next, the foldable display device of the unfolded state may detect its folding (S1220). At this time, the foldable display device may detect its folding or unfolding through a sensor unit.

Next, the foldable display device of the folded state may re-split the third display region into a first display region and a second display region (S1230). Next, the foldable display device of the folded state may display a first split content provided from a first application on the first display region and display a second split content provided from a second application on the second display region (S1240). In this case, the first split content may correspond to the content displayed in a first region of the third display region when the foldable display device is folded, and the second split content may correspond to the content displayed in a second region of the third display region when the foldable display device is folded. Also, the first split content may be the same content as the first content, and the second split content may be the same content as the second content. Since this is the same description in FIGS. 8 and 9, its detailed description will be omitted.

Although the preferred embodiments have been described as above, the present specification is not limited to the aforementioned specific embodiment, and various modifications may be made in the aforementioned embodiments by the person with ordinary skill in the art to which the present specification pertains, without departing from claims. The modified embodiments should not be understood individually from technical spirits or aspects of the present specification.

Also, the foldable display device and the method for controlling the same may be implemented in a recording medium, which can be read by a processor provided in a network device, as a code that can be read by the processor. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a type of carrier wave such as transmission through Internet. Also, the recording medium that can be read by the processor may be distributed in a computer system connected thereto through the network, whereby codes that can be read by the processor may be stored and implemented in a distributive mode.

Also, in this specification, it is to be understood that an angle, a distance, and a direction may mean exact values and include a substantial angle, a substantial distance and a substantial direction in a certain range. In other words, in this specification, an angle, a distance and a direction may mean a substantial angle, a substantial distance and a substantial direction and may have an error of a certain range.

Also, in this specification, both the product invention and the method invention have been described, and description of both inventions may be made complementally if necessary.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

What is claimed is:

1. A foldable display device comprising:
a display unit including a first display region and a second display region;

a motion sensor configured to detect that the foldable display device is folded or unfolded by sensing a folding angle of the foldable display device; and
a processor configured to control the display unit and the motion sensor,
wherein the processor is further configured to:
display first content provided from a first application on the first display region and second content provided from a second application on the second display region in a folded state of the foldable display device,
wherein the first application and the second application are applications installed in the foldable display device,
generate a third display region by merging the first display region and the second display region with each other and generate a third application by using at least one of the first application and the second application,
display third content provided from the third application on the third display region when the foldable display device in the folded state is unfolded,
re-split the third display region into the first display region and the second display region,
display a first split content provided from the first application on the first display region and a second split content provided from the second application on the second display region when the foldable display device in an unfolded state is folded,
if the first application is a map application and the second application is a search application, display the third content provided from the third application on the third display region when the foldable display device is unfolded,
wherein the third application being a map application generated using the first application, and the third content being the content that at least one indicator corresponding to at least one search result included in the second content is displayed on a map image included in the first content, and
if the user input corresponding to the at least one indicator is detected in the unfolded state, display the third content in the first region of the third display region and display a corresponding part of the second content corresponding to the detected indicator in the second region of the third display region,
wherein the first split content is a same content as the first content, and the second split content is a same content as the second content, and
wherein the third content is generated by merging the first content and the second content.

2. The foldable display device according to claim 1, wherein the motion sensor is further configured to detect a touch input of a user, and
wherein processor is further configured to:
detect that a movable object included in the third content is moved from the first region to the second region or from the second region to the first region in accordance with the touch input in the unfolded state of the foldable display device, and
when the foldable display device is folded, the movable object located in the first region is included in the first split content and the movable object located in the second region is included in the second split content.

3. The foldable display device according to claim 1, wherein the foldable display device of the folded state is folded in a direction to which the first display region and the second display region are externally exposed.

4. The foldable display device according to claim 1, wherein the processor is further configured to provide a feedback for requesting a user input as to whether the third application is generated, if the foldable display device is unfolded.

5. The foldable display device according to claim 4, wherein the processor is further configured to:
generate the third application, and display the third contents provided from the third application on the third display region when the user input for requesting generation of the third application is detected, and
display the first content provided from the first application on the first region of the third display region and the second content provided from the second application on the second region of the third display region when the user input for requesting generation of the third application is not detected.

6. The foldable display device according to claim 4, wherein the feedback is at least one of a visual feedback, an auditory feedback, and a tactile feedback.

7. The foldable display device according to claim 1, wherein the processor is further configured to:
if the first application and the second application are social network service (SNS) applications, display the third content provided from the third application on the third display region when the foldable display device is unfolded,
wherein the third application being a merged SNS application of the first application and the second application, and the third content being the content generated by arranging each part of the first content and each part of the second part in accordance with predetermined organization.

8. The foldable display device according to claim 1, wherein the processor is further configured to:
if the first application and the second application are search applications, display the third content provided from the third application on the third display region when the foldable display device is unfolded,
wherein the third application being a merged search application of the first application and the second application, and the third content being the content that includes a search result for a merged search keyword of a first keyword of the first content and a second keyword of the second content.

9. The foldable display device according to claim 1, wherein the processor is further configured to:
if the first application and the second application are messenger applications, display the third content provided from the third application on the third display region when the foldable display device is unfolded,
wherein the third application being a merged messenger application of the first application and the second application, and the third content being the content that provides a messenger service for a merged chatting group of a first chatting group of the first content and a second chatting group of the second content.

10. The foldable display device according to claim 9, wherein the messenger application is at least one of a text messenger application, an audio messenger application, and a video messenger application.

11. The foldable display device according to claim 10, wherein the video messenger application includes a video conference application.

12. The foldable display device according to claim 9, wherein the processor is further configured to:
re-split the third display region into the first display region and the second display region, and provide the first split content to the first display region as a first mode and the second split content to the second display region as a second mode,
wherein each of the first mode and the second mode being any one of a text chatting mode, an audio chatting mode, and a video chatting mode, and the first mode and the second mode being different from each other.

13. The foldable display device according to claim 12, wherein the first split content corresponds to a content displayed in a first region of the third display region when the foldable display device is folded, and
the second split content corresponds to a content displayed in a second region of the third display region when the foldable display device is folded,
wherein the first region corresponding to the first display region and the second region corresponding to the second display region.

14. The foldable display device according to claim 1, wherein the processor is further configured to:
if the first application is a contact address application, and the second application is a photo gallery application, display the third content provided from the third application on the third display region when the foldable display device is unfolded,
wherein the third application being a photo gallery application generated using the second application, and the third content being the content that includes at least one photo associated with a person corresponding to at least one contact address included in the first content, among photos included in the second content.

15. A method for controlling a foldable display device, the method comprising:
displaying a first content provided from a first application on a first display region and a second content provided from a second application on a second display region in a folded state of the foldable display device,
wherein the first application and the second application are applications installed in the foldable display device;
generating a third display region by merging the first display region and the second display region with each other and generating a third application by using at least one of the first application and the second application;
displaying a third content provided from the third application on the third display region when the foldable display device in the folded state is unfolded;
re-splitting the third display region into the first display region and the second display region when the foldable display device in an unfolded state is folded; and
displaying a first split content provided from the first application on the first display region and a second split content provided from the second application on the second display region,
if the first application is a map application and the second application is a search application, displaying the third content provided from the third application on the third display region when the foldable display device is unfolded,
wherein the third application being a map application generated using the first application, and the third content being the content that at least one indicator corresponding to at least one search result included in the second content is displayed on a map image included in the first content; and
if the user input corresponding to the at least one indicator is detected in the unfolded state, displaying the third content in the first region of the third display region and displaying a corresponding part of the second content corresponding to the detected indicator in the second region of the third display region,
wherein the first split content is a same content as the first content, and the second split content is a same content as the second content, and
wherein the third content is generated by merging the first content and the second content.

* * * * *